United States Patent
Oya

(10) Patent No.: US 10,131,156 B2
(45) Date of Patent: Nov. 20, 2018

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Masashi Oya, Soka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/473,412

(22) Filed: Mar. 29, 2017

(65) Prior Publication Data
US 2017/0282588 A1 Oct. 5, 2017

(30) Foreign Application Priority Data

Mar. 31, 2016 (JP) .................. 2016-072601
Dec. 13, 2016 (JP) .................. 2016-241709

(51) Int. Cl.
*B41J 2/21* (2006.01)
*H04N 1/54* (2006.01)

(52) U.S. Cl.
CPC .............. *B41J 2/2103* (2013.01); *H04N 1/54* (2013.01)

(58) Field of Classification Search
CPC ... B41J 2/045; B41J 2/01; B41J 2/2103; B41J 2/18; B41J 2/175; B41J 2/17503; B41J 2/17563; B41J 2/17566; B41J 2/17593; B41J 2/17596; B41J 2/14064; B41J 2/14072; B41J 2/1404; B41J 2/4753; B41J 2002/14185
See application file for complete search history.

(56) References Cited

U.S. PATENT DOCUMENTS

| | | |
|---|---|---|
| 2005/0128523 A1 | 6/2005 | Liu et al. |
| 2012/0223982 A1 | 9/2012 | Kondo |
| 2013/0201501 A1 | 8/2013 | Nishikawa |
| 2013/0300785 A1 | 11/2013 | Tsuchiya |

FOREIGN PATENT DOCUMENTS

| | | |
|---|---|---|
| CN | 1464841 A | 12/2003 |
| CN | 102653181 A | 9/2012 |
| CN | 103167956 A | 6/2013 |
| EP | 1391301 A1 | 2/2004 |
| EP | 1542448 A2 | 6/2005 |
| JP | 2005176378 A | 6/2005 |
| JP | 2014-040011 A | 3/2014 |

*Primary Examiner* — Kristal Feggins
(74) *Attorney, Agent, or Firm* — Canon U.S.A., Inc. IP Division

(57) ABSTRACT

An image processing apparatus provides image processing which realizes a representation of a low gloss while preventing a decrease in a density range of an image to be formed which can be represented on a recording medium. The image processing apparatus includes an input unit configured to input image data representing an image, a first determination unit configured to determine, based on the image data, a first recording amount for use in recording by arranging the colored ink side by side on the recording medium and a second recording amount for use in recording by stacking the colored ink in discrete positions on the recording medium, and an output unit configured to output layout data indicating a layout of the colored ink on the recording medium, based on the first recording amount and the second recording amount.

13 Claims, 22 Drawing Sheets

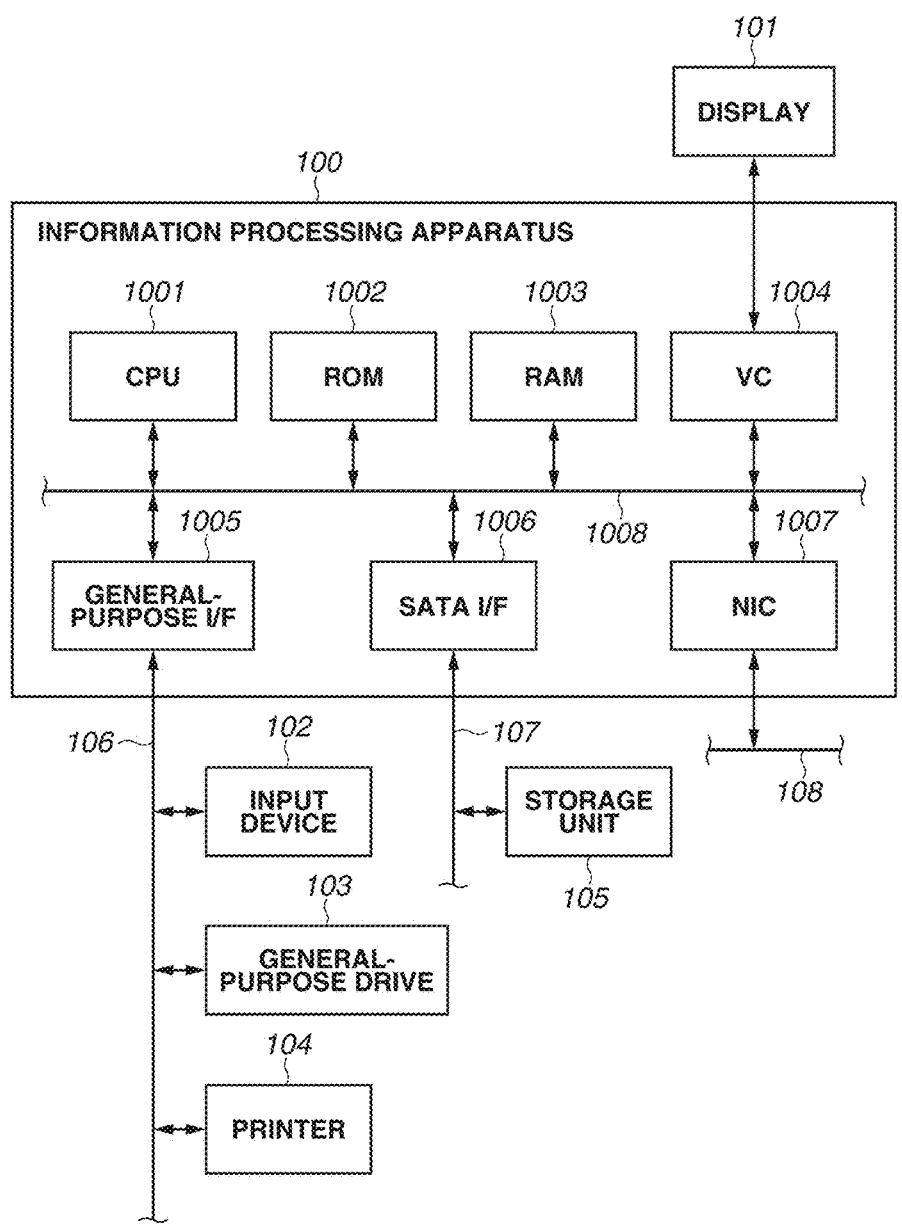

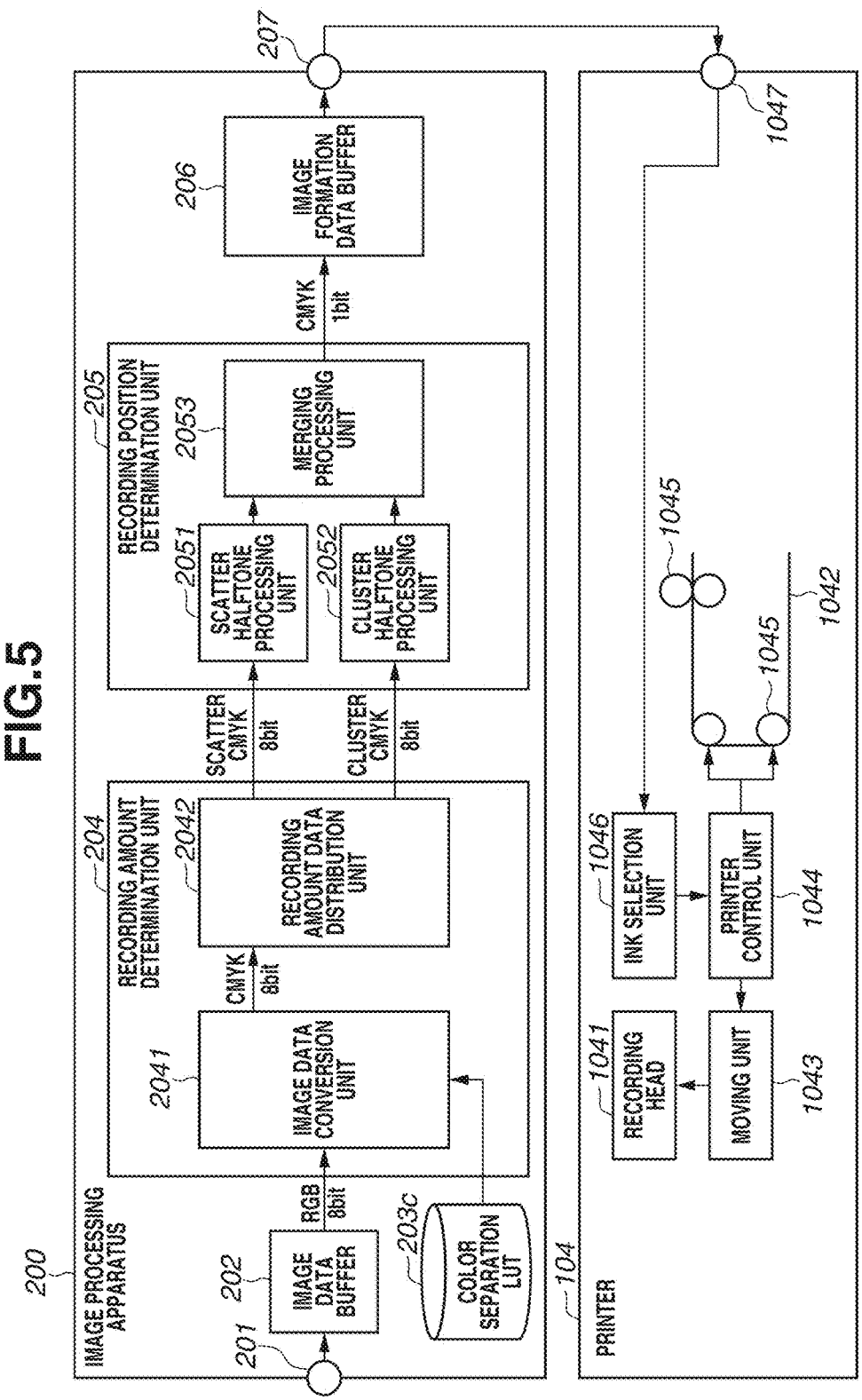

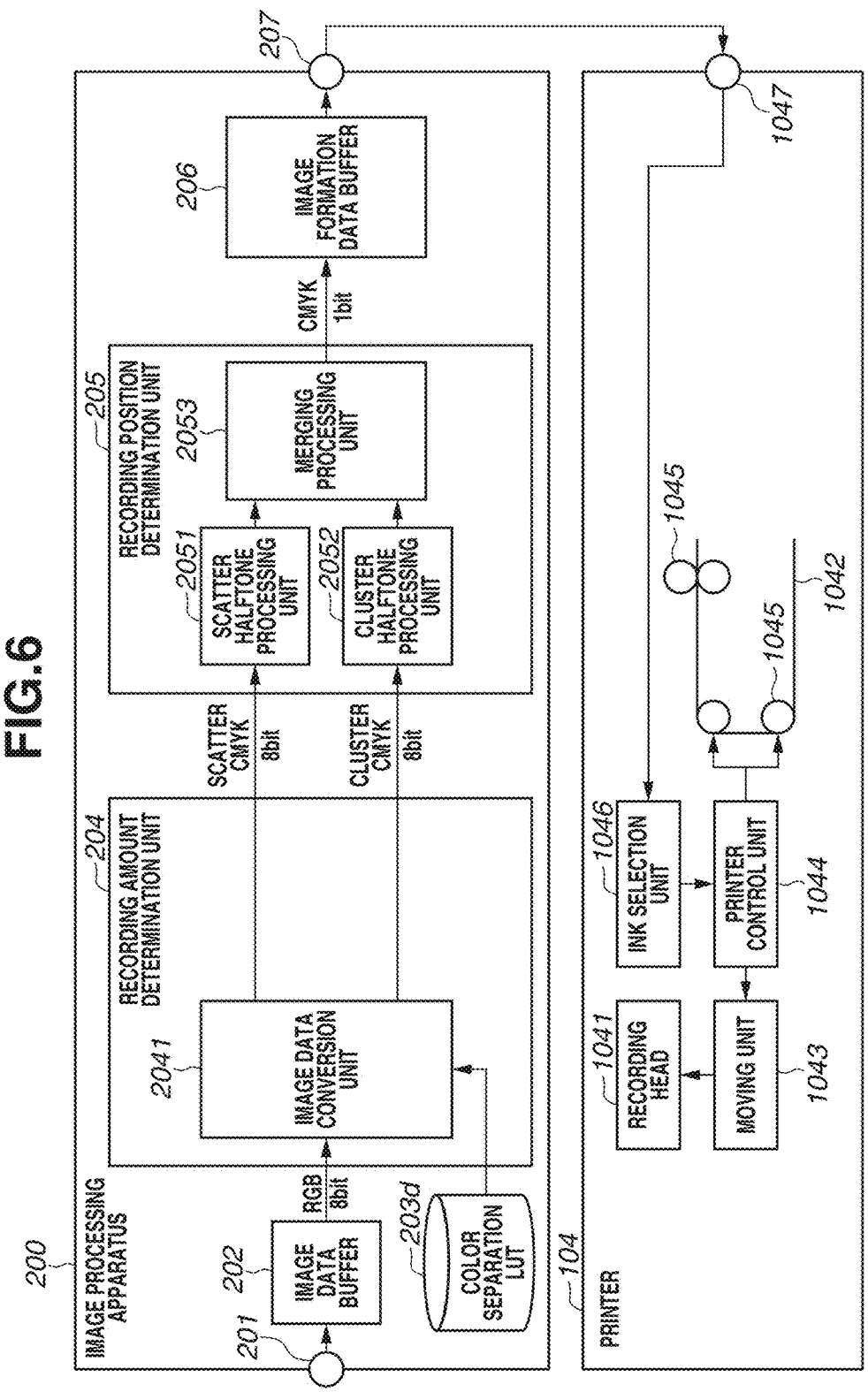

FIG.7A

| INPUT SIGNAL VALUE (8 BITS) | | | RECORDING AMOUNT (8 BITS) | | | | | ~203a |
|---|---|---|---|---|---|---|---|---|
| R | G | B | C | M | Y | K | CL | |
| 0 | 0 | 0 | 0 | 0 | 0 | 255 | 0 | |
| 0 | 0 | 16 | 10 | 10 | 0 | 211 | 24 | |
| 0 | 0 | 32 | 20 | 20 | 0 | 179 | 36 | |
| : | : | : | : | : | : | : | : | |
| 255 | 255 | 255 | 0 | 0 | 0 | 0 | 155 | |

FIG.7B

| INPUT SIGNAL VALUE (8 BITS) | | | RECORDING AMOUNT (8 BITS) | | | | | | | | | ~203b |
|---|---|---|---|---|---|---|---|---|---|---|---|---|
| | | | SCATTER | | | | CLUSTER | | | | | |
| R | G | B | C | M | Y | K | C | M | Y | K | CL | |
| 0 | 0 | 0 | 0 | 0 | 0 | 100 | 0 | 0 | 0 | 155 | 0 | |
| 0 | 0 | 16 | 10 | 10 | 0 | 80 | 0 | 0 | 0 | 131 | 24 | |
| 0 | 0 | 32 | 20 | 20 | 0 | 60 | 0 | 0 | 0 | 119 | 36 | |
| : | : | : | : | : | : | : | : | : | : | : | : | |
| 255 | 255 | 255 | 0 | 0 | 0 | 0 | 0 | 0 | 0 | 0 | 155 | |

FIG.7C

| INPUT SIGNAL VALUE (8 BITS) | | | RECORDING AMOUNT (8 BITS) | | | | ~203c |
|---|---|---|---|---|---|---|---|
| R | G | B | C | M | Y | K | |
| 0 | 0 | 0 | 0 | 0 | 0 | 255 | |
| 0 | 0 | 16 | 10 | 10 | 0 | 211 | |
| 0 | 0 | 32 | 20 | 20 | 0 | 179 | |
| : | : | : | : | : | : | : | |
| 255 | 255 | 255 | 0 | 0 | 0 | 0 | |

FIG.7D

| INPUT SIGNAL VALUE (8 BITS) | | | RECORDING AMOUNT (8 BITS) | | | | | | | | ~203d |
|---|---|---|---|---|---|---|---|---|---|---|---|
| | | | SCATTER | | | | CLUSTER | | | | |
| R | G | B | C | M | Y | K | C | M | Y | K | |
| 0 | 0 | 0 | 0 | 0 | 0 | 100 | 0 | 0 | 0 | 155 | |
| 0 | 0 | 16 | 10 | 10 | 0 | 80 | 0 | 0 | 0 | 131 | |
| 0 | 0 | 32 | 20 | 20 | 0 | 60 | 0 | 0 | 0 | 119 | |
| : | : | : | : | : | : | : | : | : | : | : | |
| 255 | 255 | 255 | 0 | 0 | 0 | 0 | 0 | 0 | 0 | 0 | |

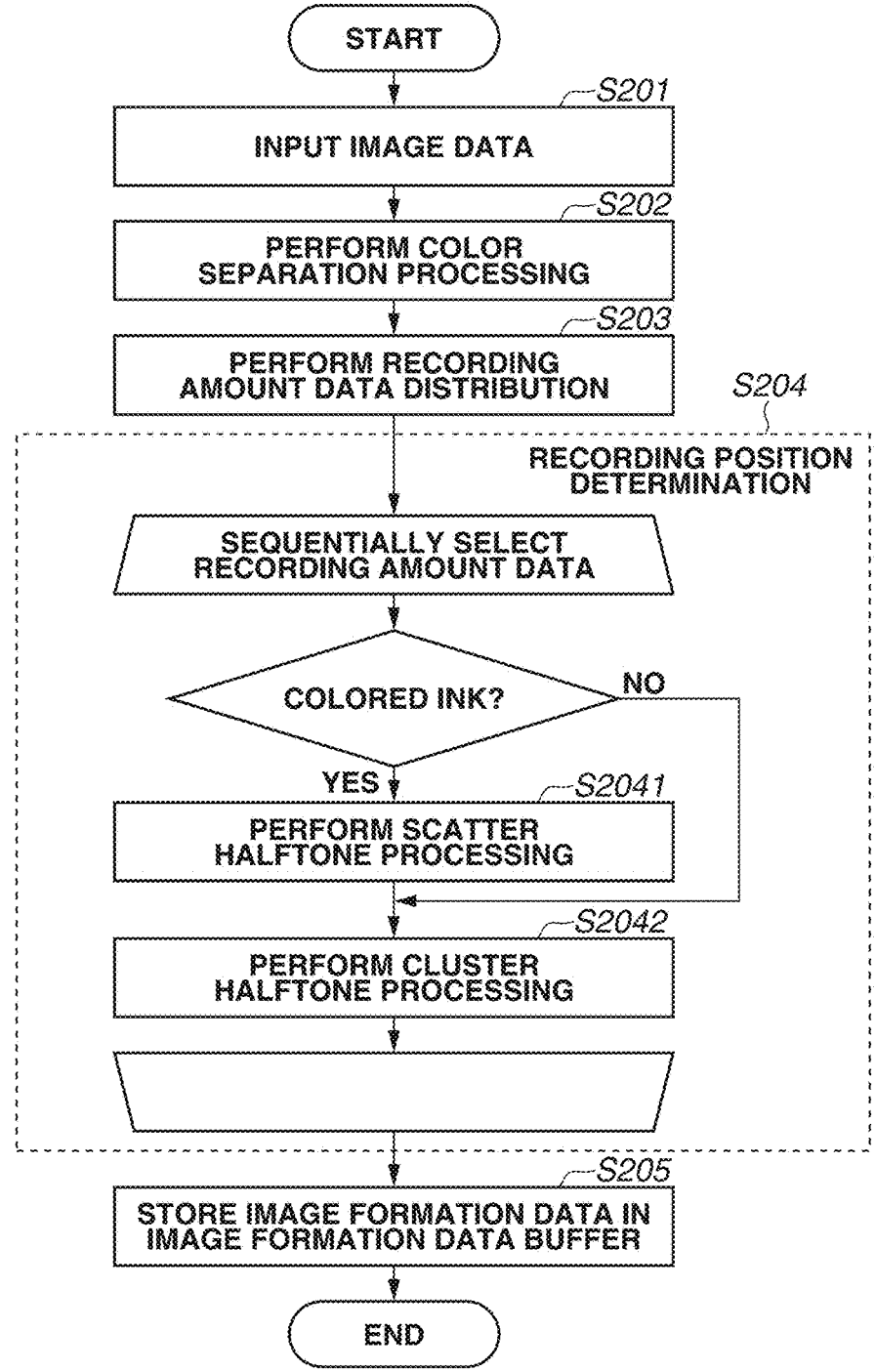

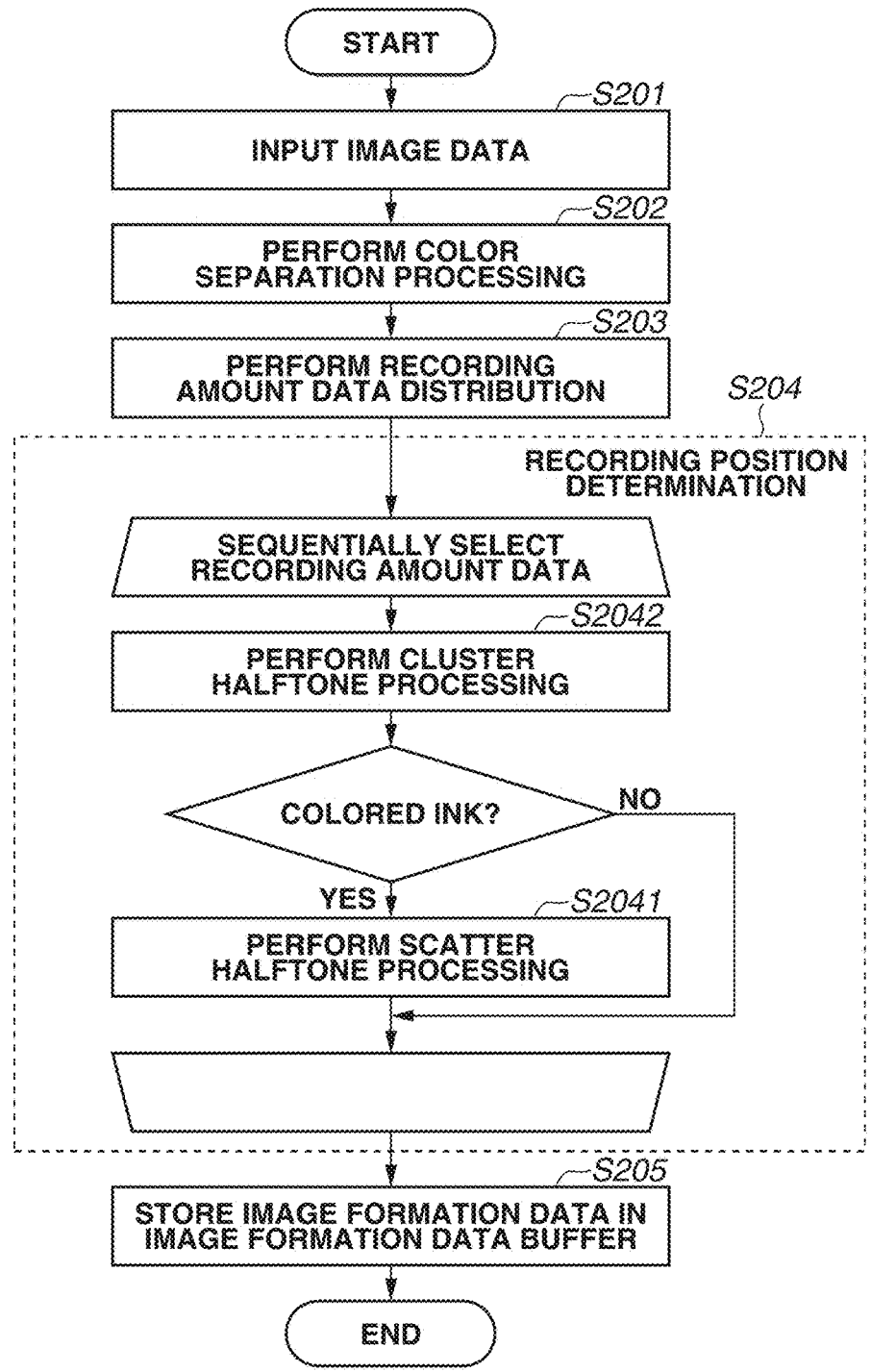

| Dc$_k$1 = 0 | Dc$_k$2 = 0 | Dc$_k$3 = 0 | Dc$_k$4 = 0 |
| Dc$_k$5 = 4 | Dc$_k$6 = 4 | Dc$_k$7 = 4 | Dc$_k$8 = 4 |

FIG.14B

| Dc$_k$1 = 4 | Dc$_k$2 = 0 | Dc$_k$3 = 0 | Dc$_k$4 = 0 |
| Dc$_k$5 = 0 | Dc$_k$6 = 4 | Dc$_k$7 = 4 | Dc$_k$8 = 4 |

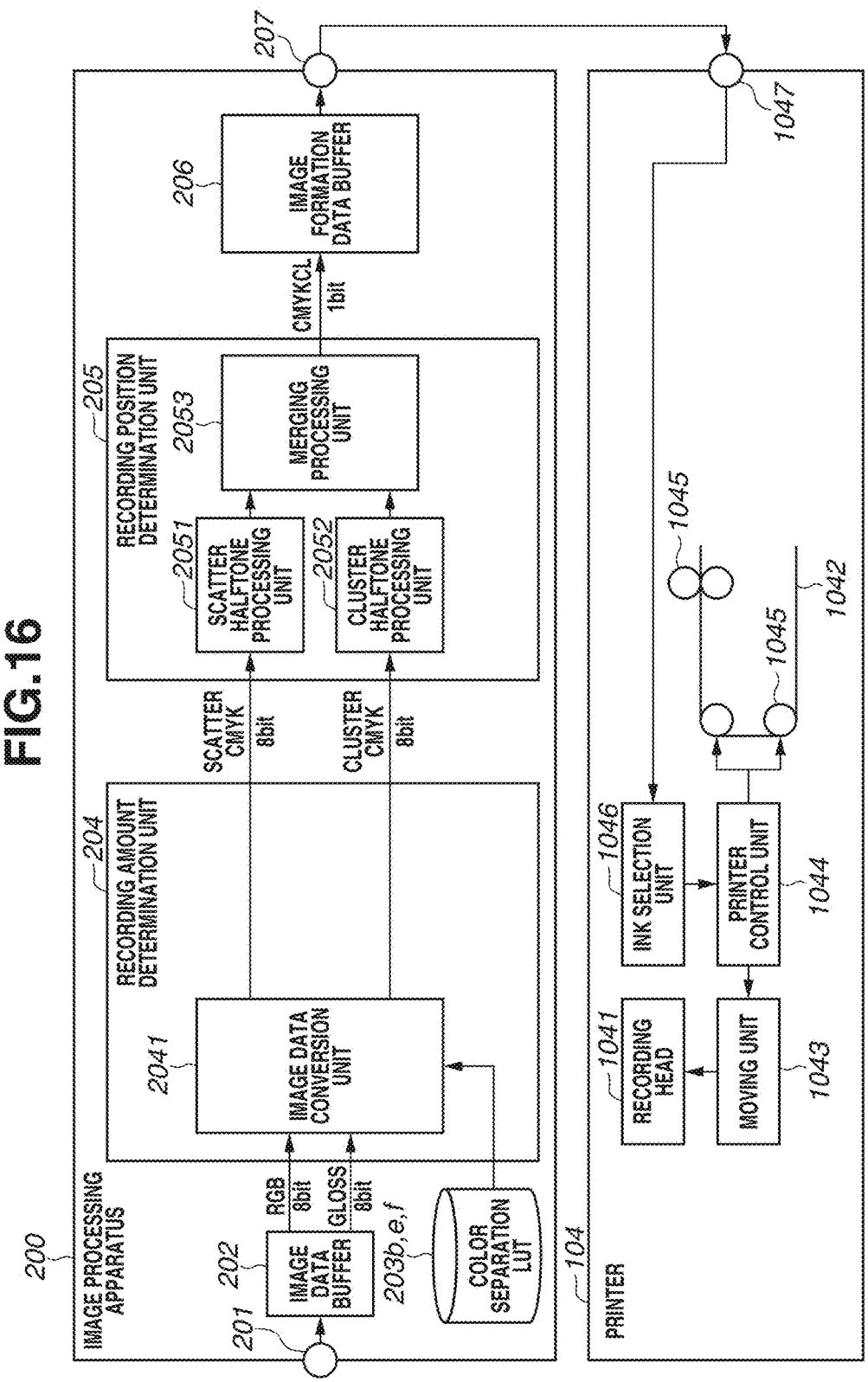

| INPUT SIGNAL VALUE (8 BITS) | | | RECORDING AMOUNT (8 BITS) | | | | | | | | |
|---|---|---|---|---|---|---|---|---|---|---|---|
| | | | SCATTER | | | | CLUSTER | | | | |
| R | G | B | C | M | Y | K | C | M | Y | K | CL |
| 0 | 0 | 0 | 0 | 0 | 0 | 150 | 0 | 0 | 0 | 105 | 0 |
| 0 | 0 | 16 | 10 | 10 | 0 | 130 | 0 | 0 | 0 | 81 | 24 |
| 0 | 0 | 32 | 20 | 20 | 0 | 110 | 0 | 0 | 0 | 69 | 36 |
| ⋮ | ⋮ | ⋮ | ⋮ | ⋮ | ⋮ | ⋮ | ⋮ | ⋮ | ⋮ | ⋮ | ⋮ |
| 255 | 255 | 255 | 0 | 0 | 0 | 0 | 0 | 0 | 0 | 0 | 105 |

| INPUT SIGNAL VALUE (8 BITS) | | | RECORDING AMOUNT (8 BITS) | | | | | | | | |
|---|---|---|---|---|---|---|---|---|---|---|---|
| | | | SCATTER | | | | CLUSTER | | | | |
| R | G | B | C | M | Y | K | C | M | Y | K | CL |
| 0 | 0 | 0 | 0 | 0 | 0 | 255 | 0 | 0 | 0 | 0 | 0 |
| 0 | 0 | 16 | 10 | 10 | 0 | 211 | 0 | 0 | 0 | 0 | 0 |
| 0 | 0 | 32 | 20 | 20 | 0 | 179 | 0 | 0 | 0 | 0 | 0 |
| ⋮ | ⋮ | ⋮ | ⋮ | ⋮ | ⋮ | ⋮ | ⋮ | ⋮ | ⋮ | ⋮ | ⋮ |
| 255 | 255 | 255 | 0 | 0 | 0 | 0 | 0 | 0 | 0 | 0 | 0 |

IMAGE PROCESSING APPARATUS, IMAGE PROCESSING METHOD AND STORAGE MEDIUM

BACKGROUND OF THE INVENTION

Field of the Invention

The present invention relates to an image processing technique for controlling gloss characteristics of images formed on recording mediums.

Description of the Related Art

In recent years, there have been increasing demands for high-quality, unique print products in the fields of commercial printing and the like. In response to the demands, there have been techniques for controlling gloss characteristics of print products by controlling gloss characteristics of each region of an image to be recorded. It is known that gloss characteristics relate to surface unevenness of a print product, and the gloss characteristics can be controlled by controlling the surface unevenness. For example, if the surface unevenness of a print product is decreased, a representation of a high gloss is realized. On the other hand, if the surface unevenness is increased, a representation of a low gloss is realized. Japanese Patent Application Laid-Open No. 2014-40011 discusses a technique in which recording of ink dots by stacking inks in a plurality of spaced target positions is performed more than recording of ink dots by forming respective inks in different target positions is performed, whereby the surface smoothness is decreased to realize a representation of a low gloss.

However, the technique of recording ink dots by stacking inks to realize a representation of a low gloss as discussed in Japanese Patent. Application Laid-Open No. 2014-40011 can cause a low ink covering ratio with respect to a recording medium, and the density range that can be expressed on a recording medium is decreased. To prevent such deterioration in image quality, a plurality of ink dots to be formed on a recording medium can be recorded in positions so that the ink dots do not overlap each other as much as possible. In this case, however, the resulting print product has small surface unevenness, so there arises a problem that a representation of a low gloss cannot be realized.

SUMMARY OF THE INVENTION

The present invention is directed to an image processing technique that realizes a representation of a low gloss of an image to be formed while preventing a decrease in density range that can be represented on a recording medium.

According to an aspect of the present invention, an image processing apparatus configured to generate data for forming an image by recording at least a colored ink on a recording medium includes an input unit configured to input image data representing an image, a first determination unit configured to determine, based on the image data, a first recording amount for use in recording by arranging the colored ink side by side on the recording medium and a second recording amount for use in recording by stacking the colored ink in discrete positions on the recording medium, and an output unit configured to output layout data indicating a layout of the colored ink on the recording medium, based on the first recording amount and the second recording amount.

Further features of the present invention will become apparent from the following description of exemplary embodiments with reference to the attached drawings.

BRIEF DESCRIPTION OF THE DRAWINGS

FIG. 2 is a block diagram illustrating an example of a configuration of an information processing apparatus 100 according to an exemplary embodiment of the present invention.

FIG. 5 is a block diagram illustrating an example of a logical configuration of an image processing apparatus 200 and a printer 104 according to a third exemplary embodiment of the present invention.

FIG. 6 is a block diagram illustrating an example or a logical configuration of an image processing apparatus 200 and a printer 104 according to a fourth exemplary embodiment of the present invention.

FIGS. 7A, 7B, 7C, and 7D each illustrate an example of a color separation look-up table (OUT) according to an exemplary embodiment of the present invention.

FIGS. 9A and 9B are flow charts each illustrating image processing which is performed by an image processing apparatus 200 according to an exemplary embodiment of the present invention.

FIG. 12 illustrates an example of ink dot recording positions determined by scatter halftone processing according to an exemplary embodiment of the present invention.

FIGS. 14A and 14B each illustrate an example of dot pattern data used in cluster halftone processing according to an exemplary embodiment of the present invention.

FIG. 16 is a block diagram illustrating an example of a logical configuration of an image processing apparatus 200 and a printer 104 according to the sixth exemplary embodiment of the present invention.

FIGS. 17A and 17B each illustrate an example of a color separation LUT according to the sixth exemplary embodiment of the present invention.

DESCRIPTION OF THE EMBODIMENTS

Figure 1A:
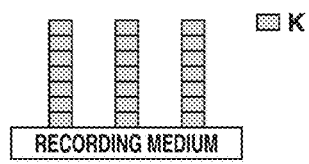
FIGS. 1A, 1B, 1C, 1D, 1E, 1F, and 1G are cross-sectional views each schematically illustrating a layout of ink dots which form an image on a recording medium.
Figure 1B:
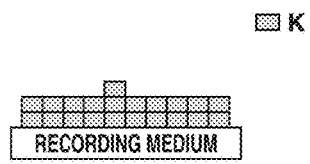

First, ink dot layouts which are realized by exemplary embodiments of the present invention will be described below with reference to FIGS. 1A to 1C, each of which schematically illustrates a cross-sectional view of a recording medium. FIG. 1A illustrates an example of recording of ink dots by stacking the ink dots high in a plurality of spaced target positions for forming ink dots on a recording medium (hereinafter, the recording is also referred to as "recording of an ink by stacking the ink in discrete positions on recording medium"). FIG. 1B illustrates an example of recording of ink dots by forming a plurality of ink dots in positions on a recording medium in such a manner that the ink dots do not overlap each other as much as possible (hereinafter, the recording is sometimes referred to as "recording of inks by placing the inks side by side on a recording medium"). As used herein, the positions in which ink dots are recorded so as to minimize the ink dots overlapping each other are positions in which a plurality of ink dots to be formed is recorded in such a manner that the ink dots do not overlap each other as much as possible. FIGS. 1A and 1B illustrate high-density portions having a large recording amount of a colored ink.

As illustrated in FIG. 1A, the recording of an ink by stacking the ink in discrete positions on the recording medium can form an image with large surface unevenness of a print product. Light reflected on the image surface having large unevenness has stronger diffuse reflection components than specular reflection components, so a representation of a low gloss can be realized. However, since the ink covering ratio is low, deterioration in image quality can occur. For example, a formed image can have inferior graininess, or the density range that can be represented can decrease. As used herein, the ink covering ratio indicates how much each region of a recording medium is coated with an ink.

On the other hand, in the case in which the colored ink placed side by side on a recording medium as illustrated in FIG. 1B, the ink covering ratio is high, so deterioration in image quality such as inferior graininess is prevented. However, the surface is smooth without unevenness, so incident light has stronger specular reflection components, and a high gloss is obtained. Thus, a representation of a low gloss cannot be realized.

Figure 1C:
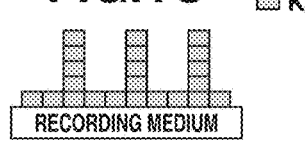

In view of the above-described cases, an image with an ink dot layout as illustrated by a schematic cross-sectional view in FIG. 1C is formed in an exemplary embodiment of the present invention. As illustrated in FIG. 1C, in order to increase the ink covering ratio, a coating layer is formed by forming a plurality of ink dots in positions on a recording medium so as to minimize the ink dots overlapping each other. As used herein, the coating layer refers to a layer of ink with which regions on the recording medium are coated so as to minimize paper-white. After the coating layer is formed, colored ink dots are recorded by stacking the colored ink dots high in a plurality of spaced target positions for forming ink dots on the recording medium within a range of recording, amount recordable on the recording medium, whereby an uneven layer with large unevenness is formed on the surface of the print product. The above-described ink dot layout is realized to realize both a representation of a low gloss and a high ink covering ratio.

Figure 1D:
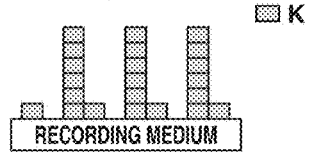
Figure 1E:
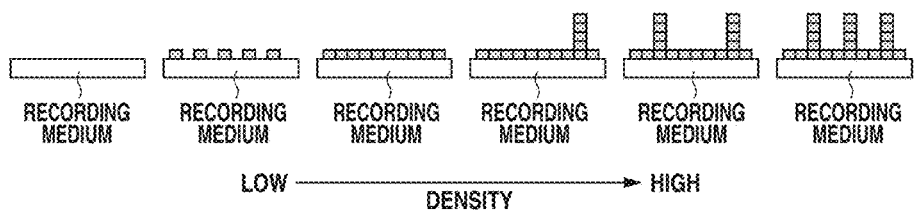
Figure 1F:
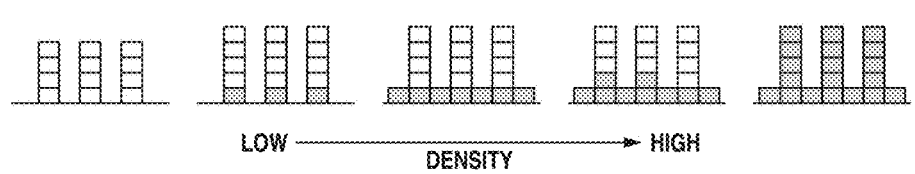

In a case of using only a colored ink as in FIG. 1F, the amount of ink for reproducing a color specified by image data is not sufficient to realize the above-described layer structure of the coating layer and the uneven layer in low-density and intermediate-density portions. Accordingly, an apparatus configuration that includes only a colored ink can realize both a representation of a low gloss and a high ink covering ratio only in high-density portions. However, use of a colorless ink in addition to the colored ink makes it possible to realize the layer structure including the coating layer and the uneven layer even in low-density and intermediate-density portions. As described above, in the case of the configuration that includes only the colored ink, a shortage of the colored ink can occur when colored ink dots are stacked high in a plurality of spaced target positions for forming ink dots on a recording medium. In this case, the use of the colorless ink in place of the colored ink reduces a difference in the recording amount of the ink between regions representing the same density on the recording medium, and an image is formed with a small difference uneven shapes on the surface of the print product according to the image density. FIG. 1F illustrates ink dot layouts that can be realized in the case of using the colorless ink. As to the low-density to intermediate-density regions, in order to reduce unevenness in density between regions, colored ink dots are preferentially placed in positions in such a manner that the plurality of ink dots formed on the recording medium do not overlap each other as much as possible. By realizing the ink dot layouts for the respective density regions as described above, a uniform low-gloss representation is realized for all density regions of the image while a decrease in graininess of the formed image and a decrease in density range that can be represented are prevented.

Various exemplary embodiments of the present invention will be described below with reference to the drawings. The exemplary embodiments described below are not intended to limit the scope of the invention. Further, not every combination of features described in the exemplary embodiments below is always essential to a technical solution of the invention. Similar configurations are given the same reference numerals.

Further, image processing apparatuses according to first, second, fifth, and sixth exemplary embodiments each include four types of colored inks and a colorless ink. Further, image processing apparatuses according to third and fourth exemplary embodiments each include only four types of colored inks. In the exemplary embodiments described below, the inks are referred to by their colors such as cyan, magenta, yellow, black, or clear. Further, the color of an ink or data of the ink is denoted by an uppercase letter such as C, M, Y, K, or CL. Specifically, C denotes cyan color or data thereof. M denotes magenta color or data thereof. Y denotes yellow color or data thereof. K denotes black color or data thereof. CL denotes transparent color or data of colorless (clear) ink. The number of inks is not limited to the number described above as an example. In the first, second, fifth, and sixth exemplary embodiments, at least one type of colored ink and a colorless ink need to be included. In the third and fourth exemplary embodiments, at least one type of colored ink needs to be included. Further, the colorless ink can slightly contain color or be turbid to an extent that the densities that can be represented on a recording medium are not affected. In the exemplary embodiments described below, the term "pixel" refers to a minimum unit that can represent gradation and is to be a target of image processing (such as color separation processing described below) of input data of a plurality of bits. In the exemplary embodiments described below, processing is performed on every 4×4 pixels.

The following describes a first exemplary embodiment. FIG. 2 is a block diagram illustrating an example of a hardware configuration according to the present exemplary embodiment. A central processing unit (CPU) 100 in an information processing apparatus 100 executes an operating system (OS) and various programs stored in a read-only memory (ROM) 1002 or a storage unit 105 using a random access memory (RAM) 1003 as a work memory to control components described below via a system bus 1008. The storage unit 105 is, for example, a hard disk drive (HDD), solid state drive (SSD), or flash memory connected to the system bus 1008 via a serial advanced technology attachment (SATA) interface (I/F) 1006. A general-purpose I/F 1005 is a serial bus interface such as a universal serial bus (USB). An input device 102 such as a mouse or keyboard, a general-purpose drive 103 for a recording medium, a printer 104, etc. are connected to the general-purpose I/F 1005. The CPU 1001 loads, via the input device 102, a program designated by a user from the storage unit 105 into the RAM 1003 and executes the program to display a user interface on a display 101 connected to a video card (VC) 1004. The user uses the user interface to select, generate, and edit image data to be input in the logical configuration of an image processing apparatus 200 described below. Image data or data from which image data is to be generated is stored in the storage unit 105 or the recording medium of the general-purpose drive 103. A network interface card (NIC) 1007 is a network interface for connecting the information processing apparatus 100 to a network such as a wired local area network (LAN) or wireless LAN. The programs to be executed by the information processing apparatus 100 and the image data or data from which image data is to be generated can be stored in a server apparatus on the network. The processing and function of the image processing apparatus 200 described below can be realized by a printer driver and, in this case, the information processing apparatus 100 in which the printer driver is installed functions as the image processing apparatus 200. The image processing apparatus 200 can be incorporated as hardware in the printer 104.

Figure 3:
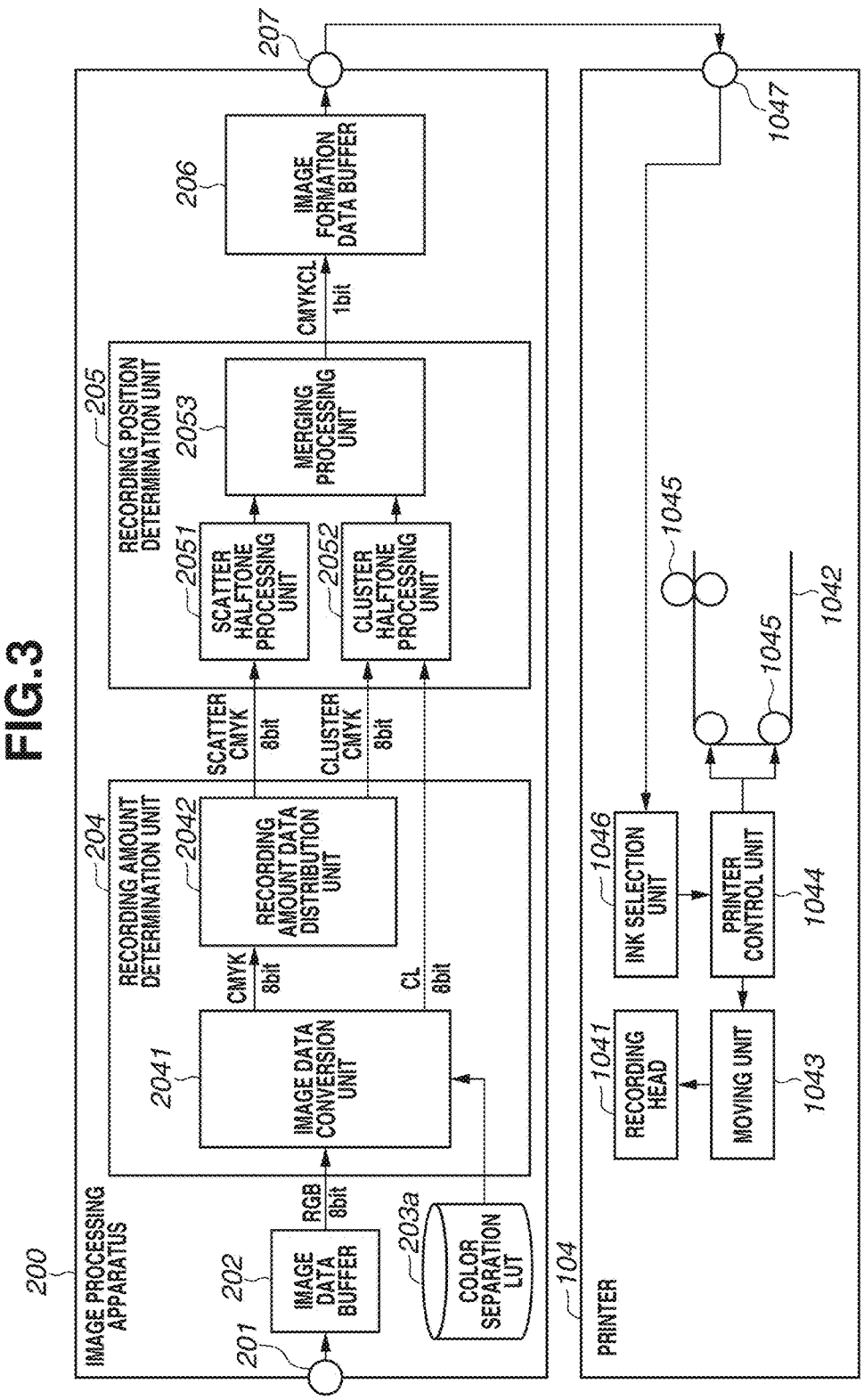
FIG. 3 is a block diagram illustrating an example of a logical configuration of an image processing apparatus 200 and a printer 104 according to a first exemplary embodiment of the present invention.

FIG. 3 illustrates details of the logical configuration of the image processing apparatus 200 and the printer 104 according to the present exemplary embodiment. The image processing apparatus 200 and the printer 104 are connected to each other via a printer interface or circuit. The image processing apparatus 200 receives input image data to be printed via an image data input terminal 201 and stores the input image data in an image data buffer 202. The image data is data which has 8 bits for each of red (R), green (G), and blue (B) and represents a three-channel color image.

An image data conversion unit 2041 in a recording amount determination unit 204 converts the image data stored in the image data buffer 202 into recording amount data which indicates a recording amount of an ink to be recorded on a recording medium. Hereinafter, this conversion processing will be referred to as color separation processing. In the color separation processing, an input signal value is converted into recording amount data or respective inks using a color separation look-up table (PUT) 203*a*, which is a table storing input signal values and corresponding recording amounts of respective inks as illustrated in FIG. 7A, and commonly-used interpolation processing. The color separation PUT 203*a* is stored in the ROM 1002. Thereafter, a recording amount data distribution unit 2042 distributes the recording amount data of the respective inks into scatter recording amount data and cluster recording amount data. The distribution is performed based on the relationship between the recording amount and the ink covering ratio on a recording medium in such a manner that regions where ink dots are to be formed on a recording medium are coated as thoroughly as possible with a colored ink. The scatter recording amount data indicates a recording amount (hereinafter, "scatter recording amount") that is used to form a coating layer. The cluster recording amount data indicates a recording amount (hereinafter, "cluster recording amount") that is used to form an uneven layer. The recording amount data of a colorless ink (CL) is entirely the cluster recording amount data because the colorless ink is to be used to form the uneven layer as described above in the description of the ink dot layouts to be realized by the present exemplary embodiment. Further, in order to reduce a difference in uneven shape on a surface of a print product which originates from the density of an image to be recorded, the cluster recording amount indicated by the cluster recording amount data is constant regardless of the input signal value. The recording amount data acquired by converting the image data is transmitted to a recording position determination unit 205.

the recording position determination unit 205 determines positions to record ink dots on the recording medium based on the recording amount data input from the recording amount determination unit 204, and generates image formation data. The recording position determination unit 205 includes three processing units: a scatter halftone processing unit 2051, a cluster halftone processing unit 2052, and a merging processing unit 2053. The scatter halftone processing unit 2051 performs halftone processing using the scatter recording amount data to acquire layout data. The cluster halftone processing unit 2052 performs halftone processing using the cluster recording amount data to acquire layout data. The two pieces of acquired layout data are merged (combined) by the merging processing unit 2053 to generate image formation data. The generated image formation data is stored in an image formation data buffer 206. Details of how the recording amount data is distributed and how the image formation data is generated from the recording amount data will be described below. The image formation data stored in the image formation data buffer 206 is output from an output terminal 207 to the printer 104. The output terminal 207 includes a general-purpose I/F.

In the printer 104, a recording head 1041 is moved in a direction orthogonal or parallel to a direction in which a recording medium 1042 is conveyed, thereby recording ink dots on the recording medium 1042 based on the image formation data generated by the image processing apparatus 200 and received from an input terminal 1047. In the present exemplary embodiment, an inkjet recording head is used as the recording head 1041. The recording head 1041 includes a plurality of recording elements (nozzles). A moving unit 1043 moves the recording head 1041 under the control by a printer control unit 1044. A conveying portion 1045 conveys the recording medium 1042 under the control by the printer control unit 1044. In the present exemplary embodiment, a multi-pass recording method is used in which the recording head 1041 performs a plurality of recording scans on a recording medium to complete an image. Further, a bidirectional printing method is used in which the recording head 1041 reciprocates and performs a recording operation in both forward and backward scans. Instead of the bidirectional printing, unidirectional printing can be employed. An ink selection unit 1046 selects an ink from inks contained in the recording head 1041 based on the image formation data of the respective inks generated by the image processing apparatus 200.

Figure 8:
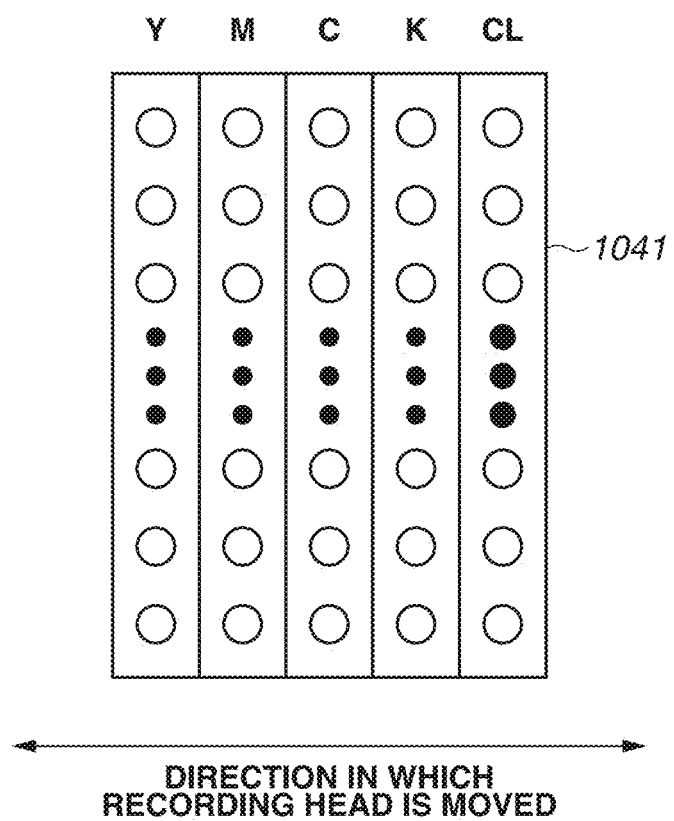
FIG. 8 illustrates an example of a configuration of a recording head according to an exemplary embodiment of the present invention.

FIG. 8 illustrates a configuration of the recording head 1041 according to the present exemplary embodiment. In the present exemplary embodiment, the recording head 1041 contains five types of inks C, M, Y, K, and CL. While a plurality of nozzles is arranged in a single line in the direction in which the recording head 1041 is moved in FIG. 8, the number of nozzles and the arrangement are not limited to that illustrated in FIG. 8. For example, nozzles of the same discharge amount can be arranged in a plurality of lines, or a plurality of nozzles can be arranged in a zigzag manner. Further, a plurality of nozzles can be arranged in a line in the direction in which the recording medium 1042 is conveyed.

Next, the following describes image forming processing which is performed by the CPU 1001 in the image processing apparatus 200, with reference to a flow chart illustrated in 9A (hereinafter, each step is given "S" before its reference numeral).

In step S201, image data is input from the image data input terminal 201 and stored in the image data buffer 202. In step S202, the RGB image data stored in the image data buffer 202 is converted into recording amount data of five planes C, M, Y, K, and CL with reference to the color separation LUT 203a. In the present exemplary embodiment, each piece of pixel data of the recording amount data acquired as a result of the color separation processing is treated as 8-bit data of 0 to 255. The number of bits is not limited to the number specified above as an example and can be determined based on the arbitrary number of tones. In step S203, the recording amount data of each of the inks is distributed into the scatter recording amount data and the cluster recording amount data based on the relationship between the recording amount based on the recording amount data of the four planes excluding the recording amount data of the colorless ink and the ink covering ratio on the recording medium. Further, as described above, the recording amount data of the colorless ink is entirely the cluster recording amount data.

In step S204, positions at which ink dots of a recording amount determined based on the recording amount data are to be recorded on the recording medium are determined. The recording positions ink dots are determined for each recording scan for each ink, and treated as 1-bit data indicating for each pixel whether to record an ink dot. In the present exemplary embodiment, an example is described in which the ink dots are recorded by eight recording scans, meaning that 8 patterns of recording positions of ink dots are determined for each color, so that 32 patterns of recording positions of ink dots are determined for four colors C, M, Y and K in total. The recording positions of ink dots are determined by sequentially selecting and processing recording amount data of the respective inks. The recording positions of ink dots are determined based on 8-plane recording amount data of the corresponding scatter recording amount data and the corresponding cluster recording amount data. First, in step S2041, layout data for recording ink dots only by the first four recording scans is generated based on the scatter recording amount data for use to form a coating layer. Hereinafter, the processing performed in step S2041 will be referred to as "scatter halftone processing". Thereafter, in step S2042, layout data for recording ink dots only by the last four recording scans is generated based on the cluster recording amount data for use to form an uneven layer. After the two pieces of layout data are generated, merging processing is performed to merge the two pieces of layout data to determine eight patterns of recording positions of ink dots in total. Hereinafter, the processing performed in step S2042 will be referred to as "cluster halftone processing". The merging processing merges the layout data for the first four recording scans and the layout data for the last four recording scans by connecting the two pieces of layout data. As described above, recording based on the scatter recording amount data is performed in the first four recording scans, and recording based on the cluster recording amount data is performed in the last four recording scans. In this manner, ink dots can be recorded, based on the cluster recording amount data, on ink dots recorded based on the scatter recording amount data. Details of how the recording positions of ink dots are determined in steps S2041 and S2042 will be described below. In step S205, based on the determined recording positions of ink dots for the respective recording scans for the respective inks, image formation data of an entire image or image formation data of an arbitrary size such as a size of a bandwidth of each recording scan is generated and stored in the image formation data buffer 206.

The printer 104 receives the image formation data from the input terminal 1047, and after the ink selection unit 1046 selects an ink that corresponds to the image formation data, image formation is started. In the image formation, while the recording head 1041 is moved in the direction orthogonal or parallel to the direction in which the recording medium 1042 is moved, the nozzles are driven at regular driving intervals to form an image on the recording medium 1042. The recording medium 1042 of an amount necessary for forming an image is conveyed by the conveying portion 1045 in each scan.

Then, the series of image formation processing on image data is completed. Next, details of processing performed in steps S203, S2041, and S2042 will be described in this order below.

Figure 10:
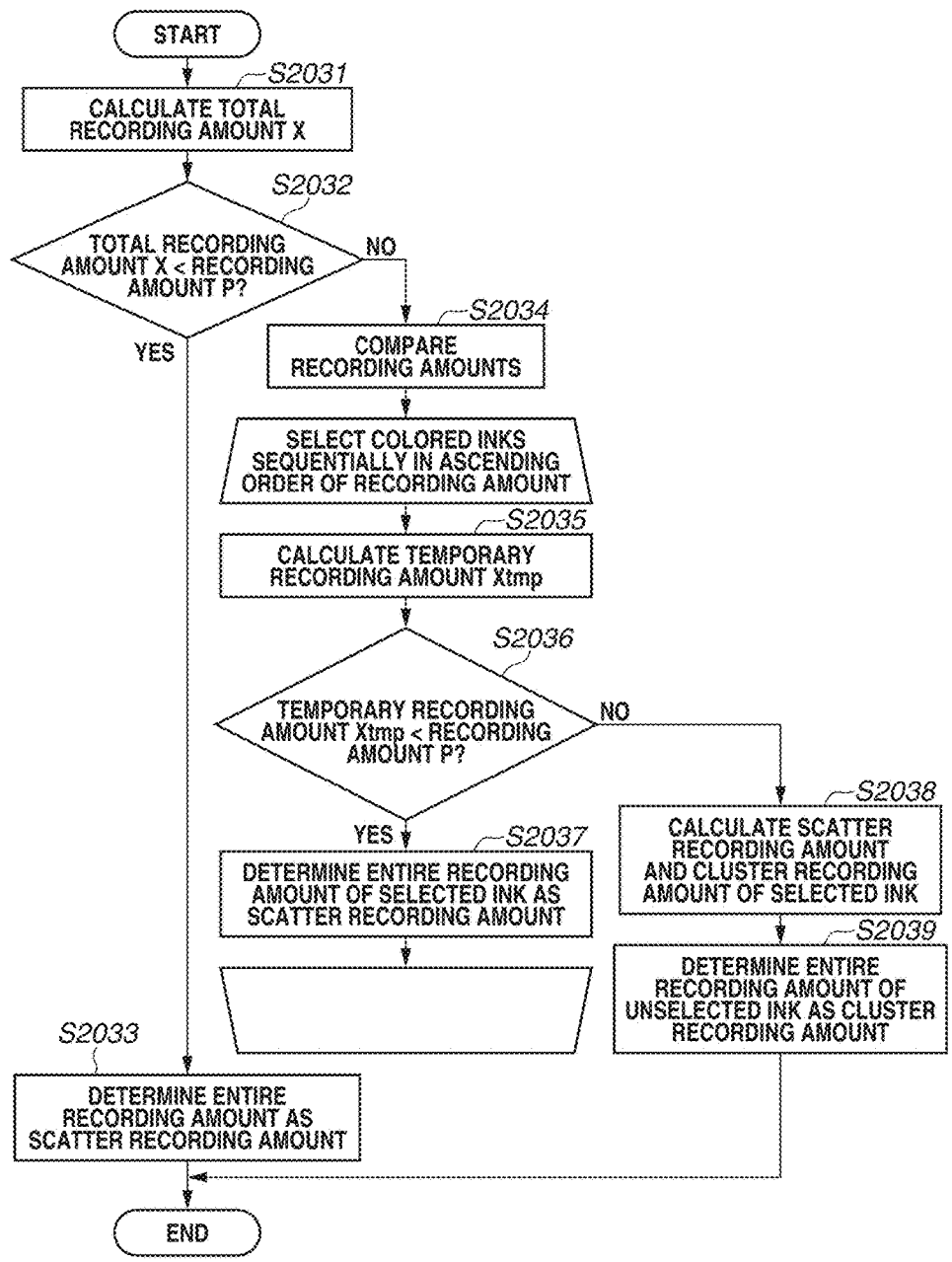
FIG. 10 is a flow chart illustrating recording amount data distribution processing according to an exemplary embodiment of the present invention.

The following describes the recording amount data distribution (step S203) in detail with reference to a flow chart illustrated in FIG. 10. In step S2031, a total recording amount X is calculated by adding the recording amounts of the respective inks. In step S2032, the total recording amount X calculated in step S2031 is compared with a preliminarily stored recording amount P for an ink covering ratio of 100%. The recording amount P for an ink covering ratio of 100% is a recording amount that is necessary for forming dots in all pixels. As a result of the comparison, if the total recording amount X is smaller than the recording amount P (YES in step S2032), the recording amount corresponding to the input signal value is not sufficient enough for the colored inks to coat 100% of regions where ink dots are to be formed on the recording medium, so in step S2033, the entire recording amount is determined as the scatter recording amount. On the other hand, if the total recording amount X is larger than the recording amount P (NO in step S2032), the colored inks can coat 100% of the regions where ink dots are to be formed on the recording medium and also can form unevenness, so the processing proceeds to step S2034.

In step S2034, the recording amounts of the respective inks are compared. Then, the inks are selected in ascending order of recording amount, and the processing in steps S2035 to S2037 is repeated for the selected one of the inks. In the formation of the coating layer, the inks are used in ascending order of recording amount to prevent the color gamut from narrowing. While the processing in steps S2035 to S2037 is repeated, if the condition specified in step S2036 is satisfied, the repeating of the processing in steps S2035 to S2037 is ended, and the processing proceeds to step S2038.

In step S2035, based on the recording amount. $X_i$ (i=C, M, Y, K) of the selected ink and the total recording amount Xs determined already as the scatter recording amount, a temporary recording amount Xtmp is calculated from Formula 1 below:

$$Xtmp=X_i+Xs \quad \text{(Formula 1)}.$$

In step S2036, the temporary recording amount Xtmp is compared with the recording amount P. If the temporary recording amount Xtmp is smaller than the recording amount P (YES in step S2036), the processing proceeds to step S2037, and the entire recording amount $X_i$ of the selected ink is determined as the scatter recording amount. On the other hand, if the temporary recording amount Xtmp is larger than the recording amount P (NO in step S2036), the processing proceeds to step S2038, and a scatter recording amount $X_i s$ and a cluster recording amount $X_i c$ of the selected ink are calculated using Formulas 2 and 3 below:

$$X_i c = Xtmp - P \quad \text{(Formula 2)}$$

and $$X_i s = X_i - X_i c \quad \text{(Formula 3)}$$

Lastly, in step S2039, if there is an ink that is unselected in the processing of steps S2035 to S2037, the entire recording amount of the unselected ink is determined as the cluster recording amount $X_i c$.

By the above-described recording amount data distribution (step S203), the recording amount data of each colored ink is distributed into the scatter recording amount data and the cluster recording amount data.

Figure 11:
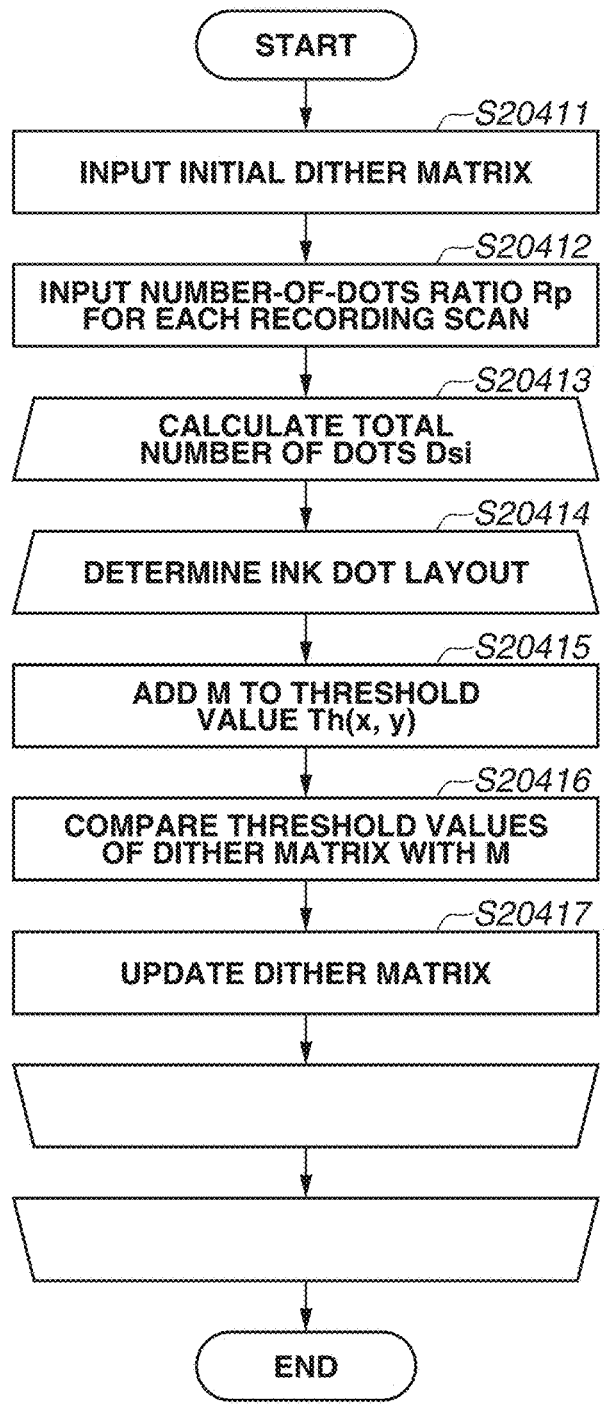
FIG. 11 is a flow chart illustrating scatter halftone processing in recording position determination processing according to the first to sixth exemplary embodiments of the present invention.

Next, the following describes the scatter halftone processing (step S2041) in detail with reference to a flow chart illustrated in FIG. 11. The scatter halftone processing (step S2041) is the processing of determining recording positions of a plurality of ink dots to be recorded on a recording medium such that the ink dots are located so as to minimize the ink dots overlapping each other. By recording ink dots in the positions determined by the processing, deterioration in image quality due to a decrease in ink covering ratio can be prevented.

In step S20411, a dither matrix held in advance is input. The dither matrix is two-dimensional data in which a threshold value is stored for each pixel as in a dither matrix 901 in FIG. 12. In each pixel a value of 0 to M−1 is stored as a threshold value, and a layout of the threshold values is determined using a publicly-known blue noise mask. The value of M is determined based on the size of the dither matrix. In the present exemplary embodiment, the size of the dither matrix is 4×4 pixels, so M is 16 (=4×4).

In step S20412, a number-of-dots ratio Rp (p=1 to 8) is input. The number-of-dots ratio Rp is data indicating how the number of ink dots to be formed is distributed to recording scans. In the present exemplary embodiment, ink dots based on the scatter recording amount data are formed in the first four recording scans among the eight recording scans in total, so the number-of-dots ratios Rp described below are input:

$$Rp=¼ \ (p=1 \text{ to } 4)$$

and $$Rp=0 \ (p=5 \text{ to } 8).$$

In steps S20413 to S20417 below, the inks are sequentially selected, and the processing is performed for each recording scan for the selected ink. Desirably, the inks K, C, M, and Y are selected in this order so that a background is formed by the inks of lower incident-light transmittances in order to prevent a decrease in the color gamut.

In step S20415, the total number of dots $Ds_i$ (i=C, M, Y, K) of the selected ink to be recorded in a 4×4 pixel region which is the same as a dither matrix 901. Further, based on the total number of dots $Ds_i$ and the number-of-dots ratio Rp, the total number of dots $Ds_i p$ to be recorded for the selected ink is calculated for each recording scan. The total number of dots $Ds_i$ is calculated using Formula 4 below:

$$Df_i = \Sigma I(x,y)/M \ (f=s,c) \quad \text{(Formula 4)},$$

where I(x, y) is a pixel value of a pixel position (x, y) indicated by the scatter recording amount data of the selected ink.

Specifically, the total number of dots $Ds_i$ is a value obtained by dividing by M an average of the pixel values of the 4×4 pixel region in the scatter recording amount data of the selected ink. In the example of recording amount data 902 for the ink K in FIG. 12, the total number of dots is expressed by $Ds_K=4$. Next, the number of dots $Ds_i p$ in each recording scan is calculated. The number of dots $Ds_i p$ in the $p^{th}$ (p=1 to 8) scan is calculated by distributing the total number of dots $Ds_i$ by a ratio determined by the number-of-dots ratio Rp for each recording scan. In an example of ink dot layouts 903 in FIG. 12, the number of dots $Ds_i p$ for each recording scan is as follows:

$$Ds_k p=1 \ (p=1 \text{ to } 4)$$

and $$Ds_k p=0 \ (p=5 \text{ to } 8).$$

The number of dots $Ds_i p$ for each recording scan must be an integer value, so depending on the value of the total number of dots $Ds_i p$ to be recorded in a region, distribution according to the number-of-dots ratio Rp is impossible, as in the case of $Ds_i p=5$. In such a case, the number of dots is distributed so as to minimize a difference between the number of dots $Ds_i p$ in each scan and $Ds_i \times Rp$ as follows:

$$Ds_i p=2 \ (p=1),$$

$$Ds_i p=1 \ (p=2 \text{ to } 4),$$

and $$Ds_i p=0 \ (p=5 \text{ to } 8).$$

Further, for a scan in which $Ds_i p=2$, the value of p does not have to be p=1 as described above and can be any of p=1 to 4.

Figure 12:
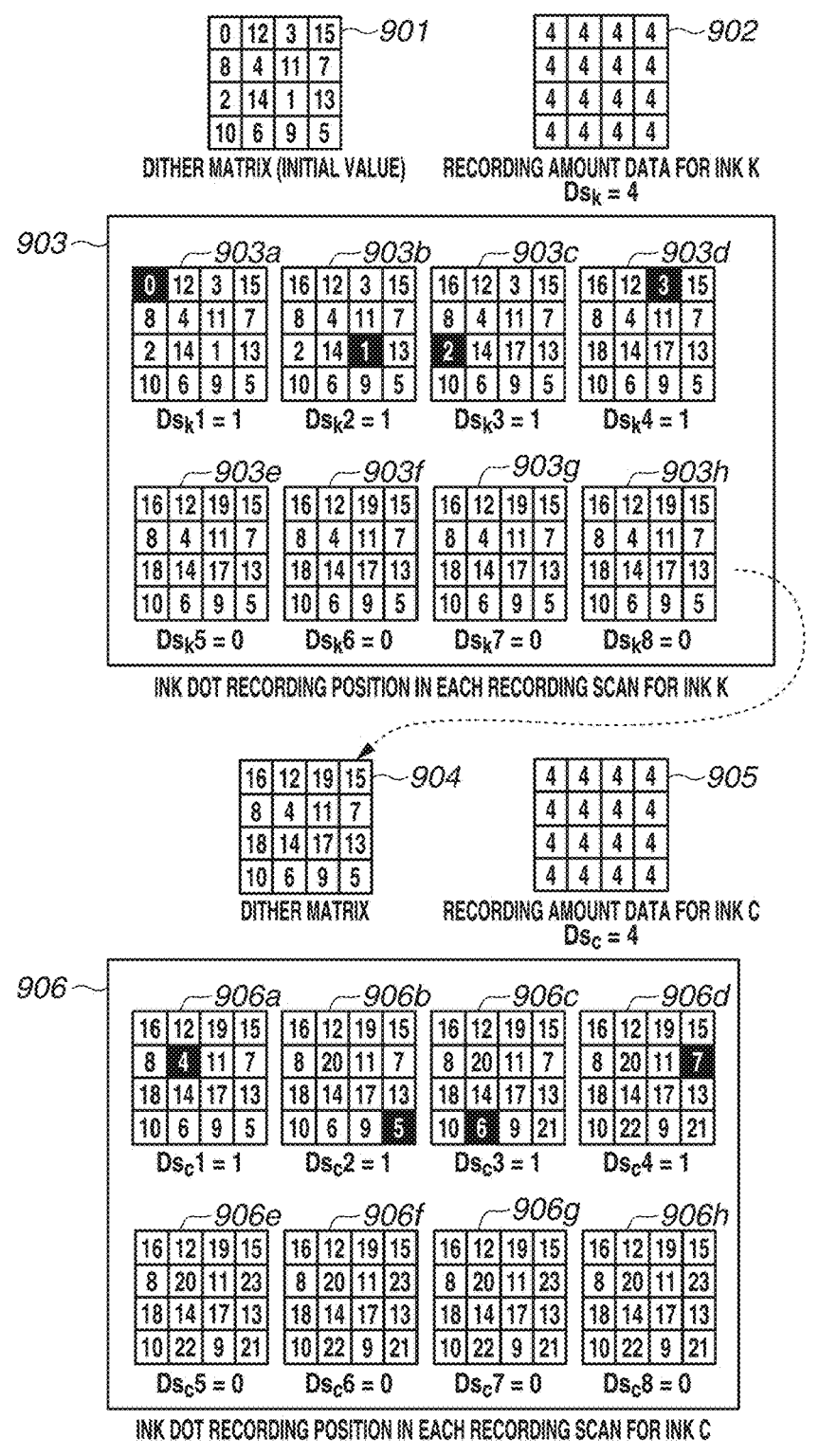

In step S20416, the threshold value in the dither matrix 901 is compared with M, and ink dot layout for each recording scan for the selected ink is determined. The ink dot layouts are determined by setting each of the $Ds_i p$ dots of pixels to an "ON state" starting from a pixel having the smallest threshold value Th(x, y) in the dither matrix 901. In the example illustrated in FIG. 12, the ink dot layout in the first recording scan for the ink K is an ink dot layout 903a, in which an ink dot of a pixel with a threshold value of 0 is set to the ON state, based on $Ds_i p=1$. As used herein, the ON state or the state in which an ink dot of a pixel is ON refers to a state in which it is determined to form the dot on the pixel. In step S20417, M is added to the threshold value Th(x, y) of the position in which the ink dot is set to the ON state in step S20416 in the dither matrix 901. As described above, the dither matrix is updated such that the threshold value of the region in which the ink dot is set to the On state exceeds M, and based on the updated dither matrix, an ink dot layout for the next recording scan is determined. The ink dot layouts 903a to 903h in FIG. 12 illustrate examples of recording positions of ink dots in (the first to eighth) recording scans for the ink K that are determined based on the recording amount data 902 of the ink K. As illustrated in FIG. 12, the positions of a plurality of ink dots to be formed on a recording medium are determined so as to minimize the ink dots overlapping each other. Further, as illustrated in the flow chart in FIG. 11, an ink dot layout for another ink is determined using the dither matrix with the threshold values updated after the ink dot layout for the selected ink is determined. As a result, the ink dot layouts 903a to 903h for the ink K and ink dot layouts 906a to 906h for the ink C in FIG. 12 are obtained. In a case where M ink dots are placed and all the values of the dither matrix become equal to or larger than M, the dither matrix is reset to the initial state, and the processing is repeated.

As a result of the above-described scatter halftone processing (step S2041), the layout data for the first four recording scans is acquired.

Figure 13:
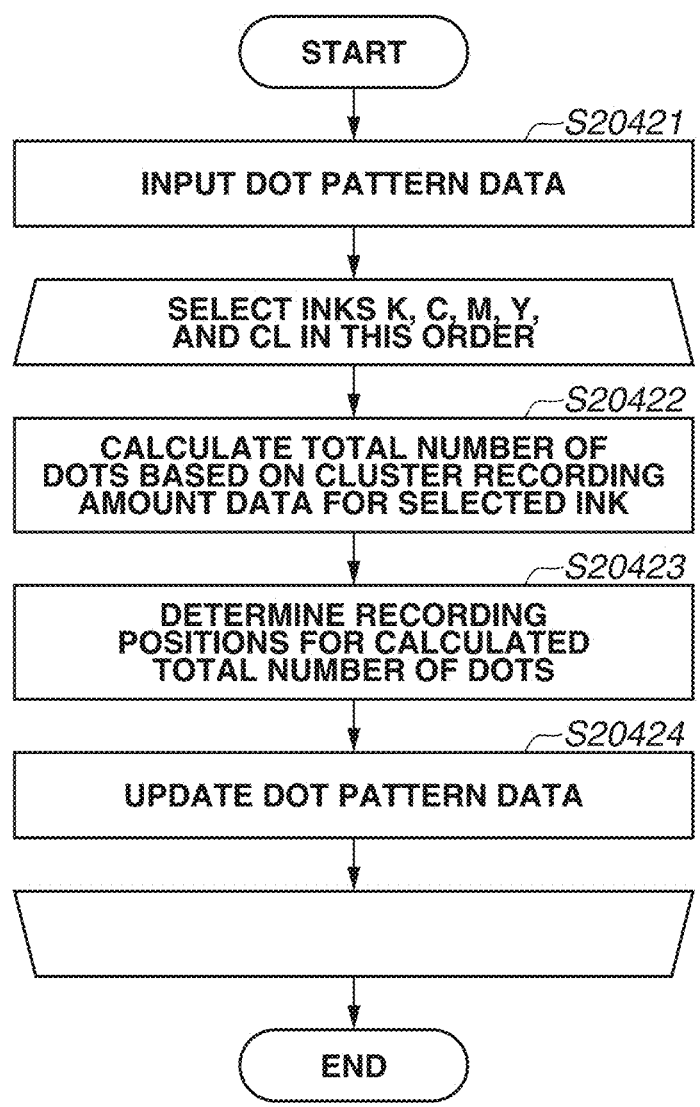
FIG. 13 is a flow chart illustrating cluster halftone processing in recording position determination processing according to an exemplary embodiment of the present invention.

Next, the following describes the cluster halftone processing (step S2042) in detail with reference to a flow chart illustrated in FIG. 13. The cluster halftone processing (step S2042) is the processing of determining an ink dot layout in which colored ink dots are recorded by stacking the colored ink dots high in a plurality of spaced target positions for forming the ink dots on a recording medium. By recording the ink dots in the positions determined by the processing, increased surface unevenness of a print product is realized to realize a representation of a low gloss.

In step S20421, dot pattern data for use in each recording scan is input. FIG. 14A schematically illustrates an example of dot patterns. The input dot pattern data is two-dimensional data which specifies recording positions and order of ink dots for each recording scan. The dot pattern data in FIG. 14A for use in the recording in each recording scan is a mere example. In general, charts of controlled number of ink dots to be recorded in each recording scan and controlled ink dot layouts are printed, and the printed charts are observed with a loupe, etc. to obtain a condition for a representation of the lowest gloss and set the condition in advance. In steps S20422 to S20424, one of the inks is selected, and the processing of steps S20422 to S20424 is repeated until the processing is performed for all the inks.

In step S20422, the total number of dots $Dc_i$ (i=C, M, Y, K, CL) is calculated based on the cluster recording amount data of the selected ink. The number of dots is calculated using Formula 4 as in step S20413. In step S20423, recording positions of ink dots are determined for the total number of dots $Dc_i$ calculated in step S20422 in the order of recording from the first in the dot pattern data input in step S20421.

In step S20424, positions determined as recording positions in the dot pattern data in step S20423 are identified, and values in the two-dimensional data that correspond to the identified positions are updated to zero. Further, the total number of dots $Dc_i$ of the selected ink is subtracted by the number of values updated to zero. In a case where all the values in the two-dimensional data become zero, the two-dimensional data is reset to the initial state, and the processing is repeated. Further, as soon as the total number of dots $Dc_i$ becomes zero, the next ink is selected, and ink dot positions are determined. In the selection of the next ink and the determination of ink dot positions, the updated dot patterns are used.

As a result of the above-described cluster halftone processing (step S2042), the layout data for the last four recording scans is acquired. Then, the two pieces of layout data generated by the scatter halftone processing (step S2041) and the cluster halftone processing (step S2402) are merged by the merging processing, whereby recording positions of ink dots on a recording medium for eight recording scans are determined.

Execution of the above-described processing control realizes a high ink covering ratio in regions on which ink dots are formed on a recording medium, and also realizes an ink dot layout with large unevenness. Further, the use of the colorless ink reduces a difference in the recording amount of the ink in the cases of representing the same density on a recording medium, and an image is formed with a small difference in uneven shapes on the surface of the print product according to the image density. In this way, a uniform low-gloss representation is realized for all density regions of the image while a decrease in graininess of the formed image and a decrease in density range that can be represented are prevented.

While the layouts in which dots are formed on all pixels are described in the present exemplary embodiment as an example of setting the recording amount P necessary for forming a coating layer to increase the ink covering ratio by the scatter halftone processing, the setting of the recording amount P is not limited to the above-described example. In setting the recording amount P, the size of ink dots at the time of being fixed onto a recording medium and the amount of ink diffused. (i.e., bleeding) to neighboring regions at the time of forming ink dots can be taken into consideration. One method of setting the recording amount P with the dot size and the bleeding taken into consideration is a method in which the surfaces of print charts acquired by printing with different recording amounts of ink are observed with a microscope or loupe to determine the recoding amount P which paper-white of the recoding medium cannot be observed by confirming whether there is paper-white of the recording medium. For example, if the ink dot size is larger than one pixel, the maximum value of the recording amount for the scatter halftone processing is reduced to be smaller than a normal value, as illustrated in FIG. 1D. By reducing the maximum value of the recording amount, recording positions of ink dots to be recorded by the scatter halftone processing are arranged not on all pixels but on fewer pixels.

Further, while the example is described in the present exemplary embodiment in which the relationship between the ink covering ratio and the recording amount is measured in advance and the recording amount P for the coating ratio of 100% is held, the above-described example is not a limiting example. For example, in order to adjust to a change in ink discharge amount and a change in ink covering ratio according to the type of a recording medium, a mechanism with which a user can calibrate the recording amount P for the coating ratio of 100% can be included. Further, the ink covering ratio of the recording, amount P does not have to be 100%. For example, if there is no problem in graininess in the case in which the ink covering ratio is 80%, the ink covering ratio of the recording amount P can be decreased to about 80%.

Further, while the example is described in the present exemplary embodiment in which the scatter halftone processing and the cluster halftone processing are performed in this order, the processing order is not limited to the order described above as an example. As illustrated in FIG. 9B, the cluster halftone processing can be performed first. Further, the scatter halftone processing and the cluster halftone processing can be performed simultaneously.

Further, while the example is described in the present exemplary embodiment in which the plurality of colored ink dots is recorded in the recording positions on the recording medium so as to minimize the ink dots overlapping each other and then the colorless ink is used to increase the surface unevenness of the print product, the recording order of the colored inks and the colorless ink is not limited to the order described above as an example. For example, a control method can be used in which a colorless ink is recorded on a recording medium prior to colored ink dots to prevent penetration of the colored ink dots into the recording medium and further increase the surface unevenness of the print product. In the case of using the effect of preventing penetration of colored inks by the use of the colorless ink as described above, the following processing is performed. First, a color separation LUT in which the recording amounts of the colorless ink for all input signal values are equal to or larger than a predetermined value is prepared, and the number-of-dots ratio Rp for use in step S20412 is set as follows, $Rp=0$ $(p=1)$, $Rp=\frac{1}{4}$ $(p=2 \text{ to } 5)$, and $Rp=0$ $(p=6 \text{ to } 8)$.

Figure 1G:
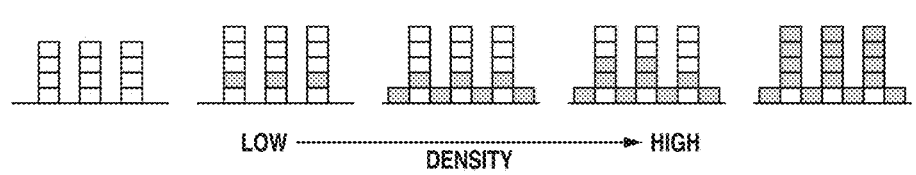

Further, the dot patterns for use in step S20421 are changed to dot patterns illustrated in FIG. 14B, and the determination of recording positions of ink dots in step S20423 is performed sequentially from the sixth recording scan, and the first recording scan is selected last. By performing the control using the above-described conditions, ink dot layouts as illustrated in FIG. 1G are realized.

Further, while the example is described in the present exemplary embodiment in which the number of recording scans is evenly divided between the scatter halftone processing and the cluster halftone processing, the ratio of recording scans is not limited to the above-described ratio. For example, in order to realize a representation of a lower gloss, the number of ink dots recorded by staking colored ink dots high in a plurality of spaced target positions for forming ink dots on a recording medium is increased. To achieve the increase, the number of recording scans in the cluster halftone processing can be increased and the number of recording scans in the scatter halftone processing can be decreased.

Further, while the example is described in the present exemplary embodiment in which the recording amounts of the colorless ink that correspond to input image data are held in the color separation LUT 203a, a method of determining the cluster recording amount $Xc_{CL}$ of the colorless ink is not limited to the above-described example. The total cluster recording amount $Xc_{all}$ is constant regardless of the input signal value, so, for example, the recording amounts of the colored inks that correspond to input image data can be held in a color separation LUT (not illustrated), and the cluster recording amount $Xc_{CL}$ can be calculated using a method described below. Specifically, the cluster recording amount $Xc_{CL}$ is calculated from the total cluster recording amount $Xc_{all}$ held in advance and the cluster recording amounts $Xc_i$ (i=C, M, Y, K) of the respective inks using Formula 5 below $Xc_{CL}=Xc_C-Xc_M-Xc_Y-Xc_K$  (Formula 5).

Figure 4:
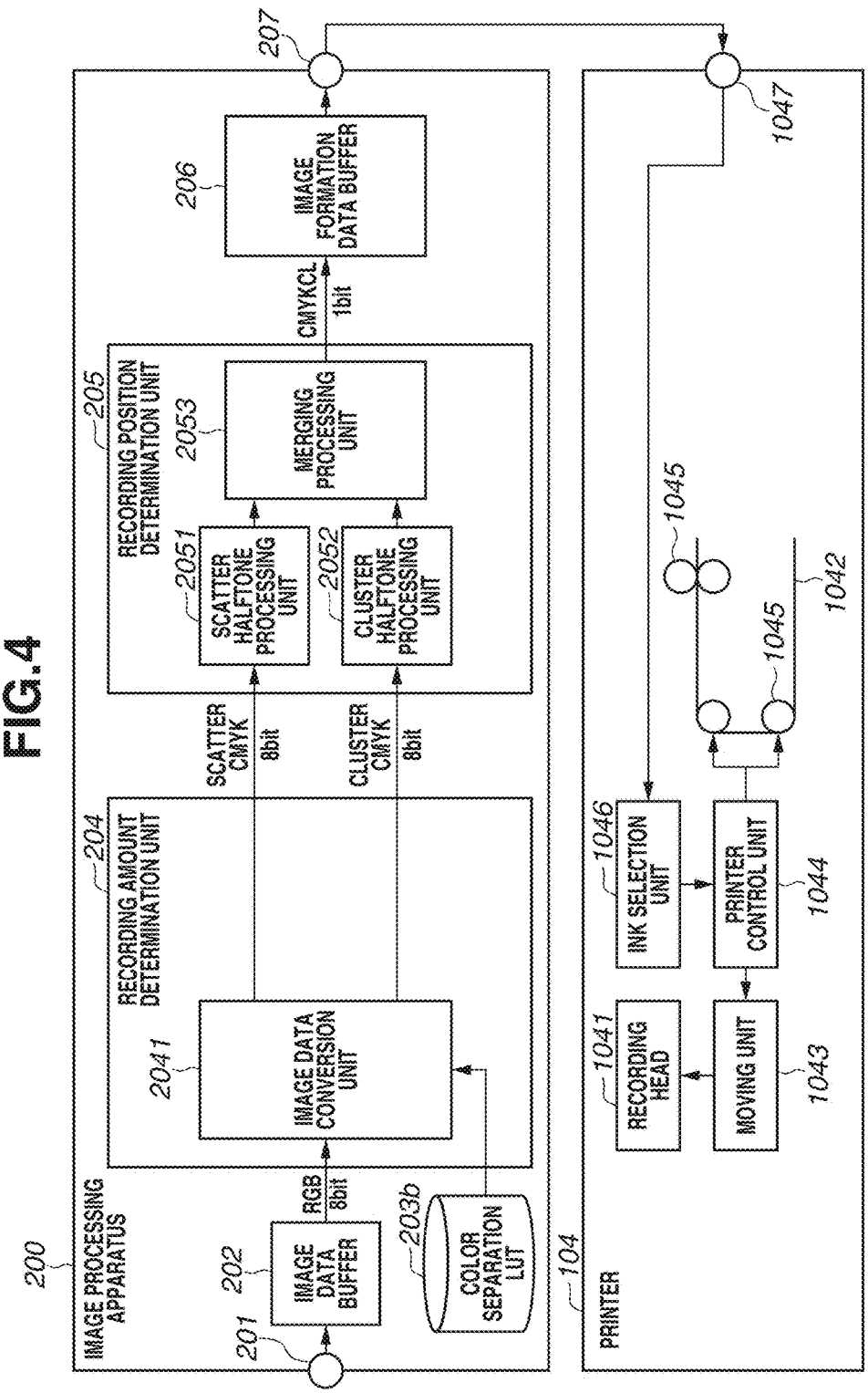
FIG. 4 is a block diagram illustrating an example of a logical configuration of an image processing apparatus 200 and a printer 104 according to a second exemplary embodiment of the present invention.

The following describes a second exemplary embodiment. A difference between the configuration of the image processing apparatus 200 according to the present exemplary embodiment and the configuration according to the first exemplary embodiment will be described. FIG. 4 is a block diagram illustrating in detail the logical configuration of the image processing apparatus 200 according to the present exemplary embodiment. The logical configuration of the image processing apparatus 200 according to the present exemplary embodiment does not include the recording amount data distribution unit 2042 of the recording amount determination unit 204 of the first exemplary embodiment. Further, the present exemplary embodiment is different from the first exemplary embodiment in that the color separation LUT used by the image data conversion unit 2041 is a color separation LUT 203b illustrated in FIG. 7B.

A difference between the image processing performed by the image processing apparatus 200 according to the present exemplary embodiment and the image processing according to the first exemplary embodiment will be described. In the first exemplary embodiment, input image data is converted into recording amount data of the respective inks using the color separation LUT 203a illustrated in FIG. 7A in which the input signal values and the recording amounts of the respective inks are held. Then, the recording position determination unit 205 distributes the recording amount into the scatter recording amount and the cluster recording amount based on the relationship between the recording amount and the ink covering ratio on a recording medium, and the recording positions of ink dots are determined. In the present exemplary embodiment, the recording amount data distribution (step S203) in the first exemplary embodiment is performed in advance to generate a color separation LUT 203b in which the correspondence relationship between input signal values indicated by image data and the scatter recording amount and the cluster recording amount is held. The image data conversion unit. 2041 uses the LUT 203b, thereby enabling to convert image data into the scatter recording amount data and the cluster recording amount data of the respective inks without performing the recording amount data distribution (step S203) during the image processing. In other words, in the flowcharts illustrated in FIGS. 9A and 9B, after the color separation processing in step S202 is performed the processing proceeds to the recording position determination in step S204 without performing the recording amount data distribution in step S203. The image processing according to the present exemplary embodiment is different from the image processing according to the first exemplary embodiment only in that the recording amount data distribution (step S203) is not performed during the image processing in FIGS. 9A and 9B, so description of the rest of the image processing is omitted.

The present exemplary embodiment realizes a high ink covering ratio in regions on which ink dots are formed on a recording medium, and also realizes an ink dot layout with large unevenness, as in the first exemplary embodiment. Further, the use of the colorless ink reduces a difference in the recording amount of the ink in the cases of representing the same density on a recording medium, and an image is formed with a small difference in uneven shapes on the surface of the print product according to the image density. In this way, a uniform low-gloss representation is realized for all density regions of the image while a decrease in graininess of the formed image and a decrease in density range that can be represented are prevented.

The following describes a third exemplary embodiment. In the first and second exemplary embodiments, the examples in which four types of colored inks and a colorless ink are used are described. In the present exemplary embodiment, only four types of colored inks are used. The present exemplary embodiment is different from the first exemplary embodiment especially in that no colorless ink is used.

A difference between the configuration of the image processing apparatus 200 according to the present exemplary embodiment and the configuration according to the first exemplary embodiment will be described. FIG. 5 is a block diagram illustrating a logical configuration of an image processing apparatus 200 according to the present exemplary embodiment. The logical configuration of the image processing apparatus 200 according to the present exemplary embodiment is different from the first exemplary embodiment in that the color separation LUT used by the image data conversion unit 2041 is a color separation LUT 203c illustrated in FIG. 7C.

The image processing performed by the image processing apparatus 200 according to the present exemplary embodiment is different from the image processing according to the first exemplary embodiment in that the LUT 203c which holds no recording amount data of the colorless ink is used. The image processing similar to the image processing according to the first exemplary embodiment is performed by reference to the LUT 203c using only the recording amount data of colored inks converted from image data in the color separation processing (step S202).

Since no colorless ink is used in the present exemplary embodiment, the ink dot layouts illustrated in FIGS. 1F and 1G among the above-described ink dot layouts realized by the above-described exemplary embodiments are not realized. However, the present exemplary embodiment realizes the ink dot layout as illustrated in FIG. 1E to realize a representation of a low gloss especially for high-density portions while realizing a high ink covering ratio at the same time.

The following describes a fourth exemplary embodiment. In the present exemplary embodiment, only four types of colored inks are used as in the third exemplary embodiment. The present exemplary embodiment is different from the second exemplary embodiment especially in that no colorless ink is used.

A difference between the configuration of the image processing apparatus 200 according to the present exemplary embodiment and the configuration according to the second exemplary embodiment will be described. FIG. 6 is a block diagram illustrating a logical configuration of an image processing apparatus 200 according to the present exemplary embodiment. The configuration of the image processing apparatus 200 according to the present exemplary embodiment is different from the second exemplary embodiment in that the color separation LUT used by the image data conversion unit 2041 is a color separation LUT 203d illustrated in FIG. 7D.

The image processing performed by the image processing apparatus 200 according to the present exemplary embodiment is different from the image processing according to the second exemplary embodiment in that the LUT 203d which holds no recording amount data of the colorless ink is used. The image processing similar to the image processing according to the first exemplary embodiment is performed by reference to the LUT 203d using only the recording amount data of colored inks converted from image data in the color separation processing (step S202).

Since no colorless ink is used in the present exemplary embodiment, the ink dot layouts illustrated in FIGS. 1F and 1G among the above-described ink dot layouts realized by the above-described exemplary embodiments are not realized. However, the present exemplary embodiment realizes the ink dot layout as illustrated in FIG. 1E to realize a representation of a lows gloss especially for high-density portions while realizing a high ink covering ratio.

Figure 15:
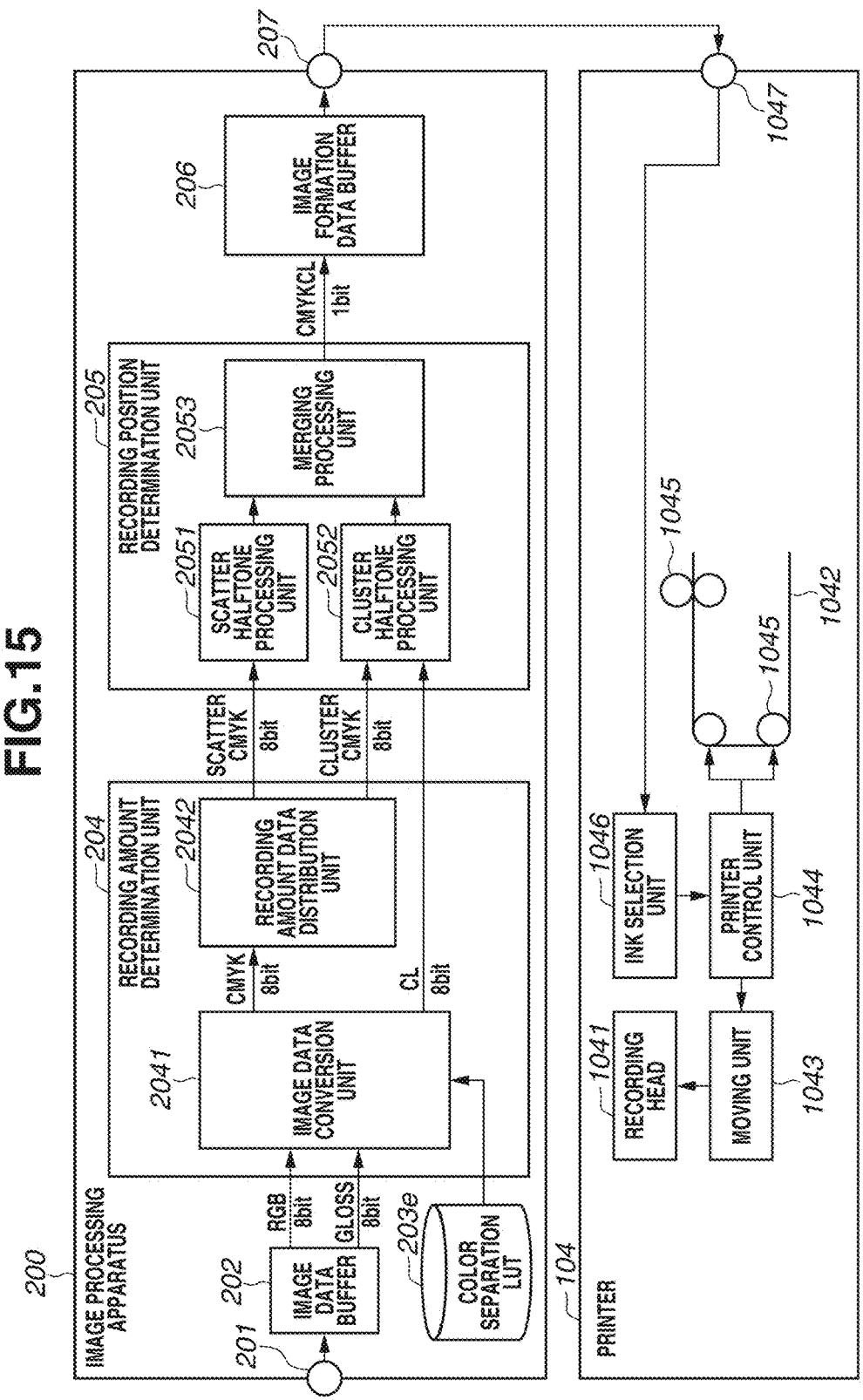
FIG. 15 is a block diagram illustrating an example of a logical configuration of an image processing apparatus 200 and a printer 104 according to the fifth exemplary embodiment of the present invention.

The following describes a fifth exemplary embodiment. A difference between the configuration of the image processing apparatus 200 according to the present exemplary embodiment and the configuration according to the first exemplary embodiment will be described. FIG. 15 is a block diagram illustrating a logical configuration of an image processing apparatus 200 according to the present exemplary embodiment. In the first exemplary embodiment, first, three-channel RGB data having color information is input as input data. Then, CMYK recording amount data acquired by the color separation processing using the input data is distributed into the scatter recording amount data and the cluster recording amount data using the recording amount P for an ink covering ratio of 100% on a recording medium. The recording amount P for an ink covering ratio of 100% on a recording medium corresponds to the scatter recording amount in the color separation LUT 203a in FIG. 7A, and the maximum value of the scatter recording amount of each ink is set to 100. In the present exemplary embodiment, four-plane image data including gloss data indicating the gloss intensity in addition to the three-channel RUB data is input as input data. The maximum value of the scatter recording amount of each ink is selected from Pl, Pm, and Ph for 100, 150, and 255 according to the gloss intensity indicated by the input data.

Figure 18:
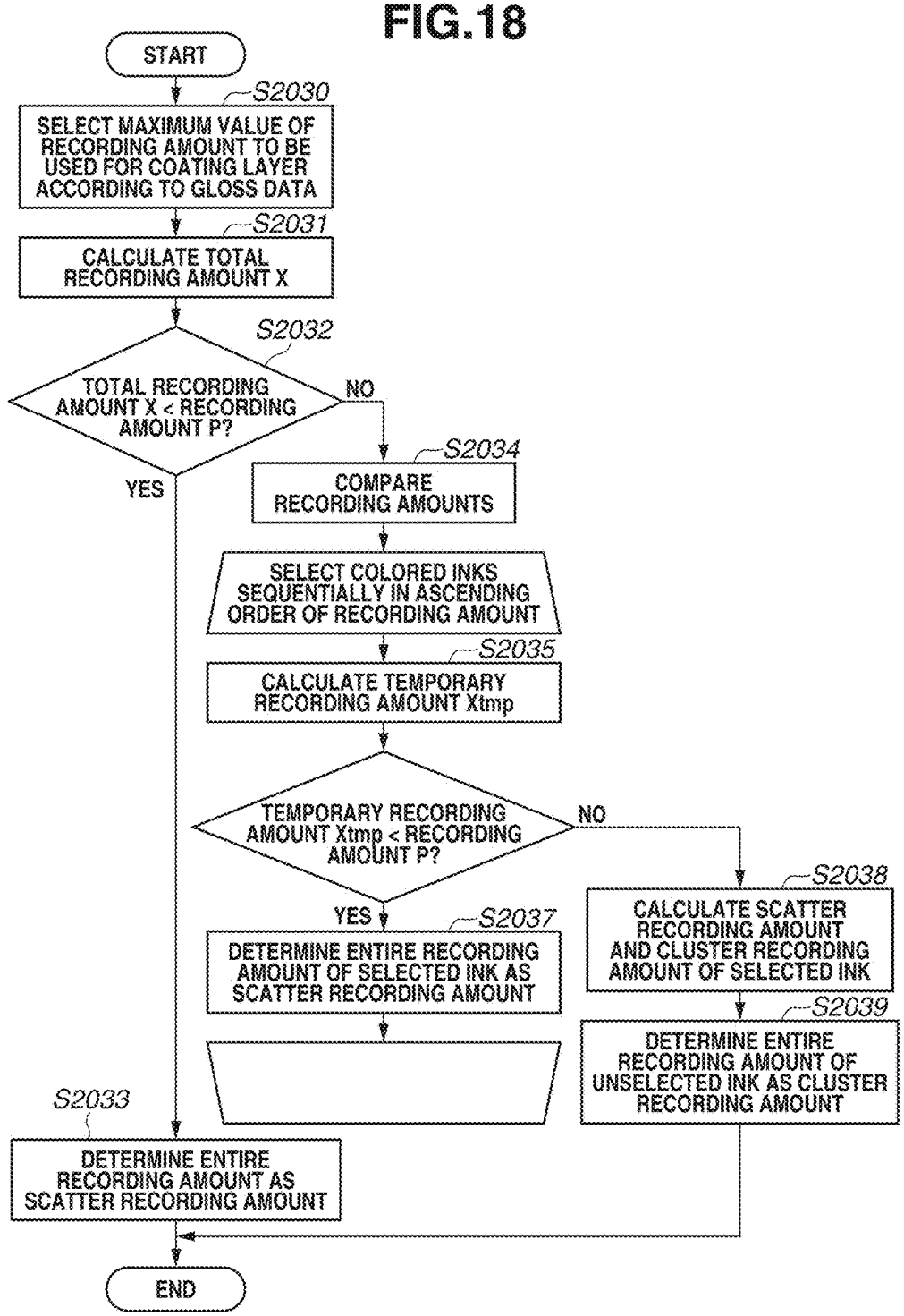
FIG. 18 is a flow chart illustrating recording amount data distribution processing according to the fifth exemplary embodiment of the present invention.

FIG. 18 is a flow chart illustrating recording amount data distribution processing (step S203). The processing according to the present exemplary embodiment is different from the processing according to the first exemplary embodiment only in that the processing performed in step S2030 in the recording amount data distribution processing (step S203) is different, so the following describes the processing performed in step S2030.

In step S2030, the maximum value of the recording amount to be used for the coating layer on the recording medium is selected from Pl, Pm, and Ph according to the gloss data indicating the gloss intensity. The gloss data is 8-bit data and has values of 0 to 255. A region with a small value of gloss data is set to be a low gloss region, and a region with a large value of gloss data is set to be a high gloss region. If the value of gloss data is 0 to 85, Pl is selected. If the value of gloss data is 86 to 170, Pm is selected. If the value of gloss data is 171 to 255, Ph is selected.

In the present exemplary embodiment, the processing is performed on each 4×4 pixel region as in the first exemplary embodiment, so the maximum value of the recording amount to be used for the coating layer is selected for each 4×4 pixel region. Accordingly, the present exemplary embodiment not only realizes a representation of a low gloss as in the first exemplary embodiment but also realizes a representation of a high gloss in a region where a high gloss is desired, by increasing the ink for forming the coating layer while decreasing the ink for forming the uneven layer to make the surface unevenness of the print product smoother. Further, in a region where an intermediate gloss between the low gloss and the high gloss is desired, a representation of the intermediate gloss is realized by setting the recording amount of ink for forming the uneven layer to an intermediate value between the values for the low gloss and the high gloss and setting the level of unevenness of the print surface to an intermediate level between the levels for the high gloss and the low gloss.

While the example is described in the present exemplary embodiment in which the gloss is selected from the three types including the low gloss, intermediate gloss, and high gloss, the above-described example is not a limiting example. If gloss control according to a wider range of gloss levels is desired, three or more types of recording amounts for an ink covering ratio of 100% on regions where ink dots are to be formed can be held according to gloss data. Alternatively, a representation of an intermediate gloss can be realized by holding two states including a low gloss state and a high gloss state and controlling the area ratio between the two states.

The following describes a sixth exemplary embodiment. A difference between a configuration of an image processing apparatus 200 according to the present exemplary embodiment and the configuration according to the second exemplary embodiment will be described. FIG. 16 is a block diagram illustrating the logical configuration of the image processing apparatus 200 according to the present exemplary embodiment. In the second exemplary embodiment, the example is described in which three-channel RGB data having color information is input as input data and image data of each ink is distributed into the scatter recording amount data and the cluster recording amount data using the color separation LUT. In the present exemplary embodiment, four-plane image data including gloss data indicating the gloss intensity in addition to the three-channel RGB data is input as input data. A LUT to be used is selected from LUTs for high gloss, intermediate gloss, and low gloss according to the gloss intensity indicated by the input data. The color separation LUTs 203b, 203e, and 203f illustrated in FIGS. 7B, 17A, and 17B are the LUTs for low gloss, intermediate gloss, and high gloss, respectively. The color separation LUTs 203b, 203e, and 203f are to be prepared in advance by performing the recording amount data distribution processing (step S203) according to the fifth exemplary embodiment.

In the present exemplary embodiment, the processing is performed on each 4×4 pixel region as in the second exemplary embodiment, so a LUT is selected for each 4×4 pixel region. Thus, not only a representation of a low gloss is realized as in the second exemplary embodiment but also a representation of a high gloss in a region where a high gloss is desired and a representation of an intermediate gloss in a region where an intermediate gloss between the low gloss and the high gloss is desired are realized.

While the example is described in the present exemplary embodiment in which the gloss is selected from three types including the low gloss, intermediate gloss, and high gloss, the above-described example is not a limiting example. If gloss control according to a wider range of gloss levels is desired, three or more types of LUTs according to the gloss levels can be held.

The following describes a seventh exemplary embodiment. In the first to sixth exemplary embodiments, the examples are described in which the number of dots $Ds_ip$ in each recording scan is calculated from the scatter recording amount data based on the total number of dots $Ds_i$ to be recorded in a region and the number-of-dots ratio Rp and an ink dot layout for each recording scan is determined based on the number of dots $Ds_ip$. In the present exemplary embodiment, an ink dot layout is determined based on the total number of dots $Ds_i$, and the determined ink dot layout is distributed into ink dot layouts for respective recording scans. The present exemplary embodiment is different from the first to sixth exemplary embodiments especially in a procedure of processing for determining an ink dot layout for each recording scan from the scatter recording amount data in the scatter halftone processing. The processing other than the scatter halftone processing is similar to the processing in the first to sixth exemplary embodiments, so description thereof is omitted.

Figure 19:
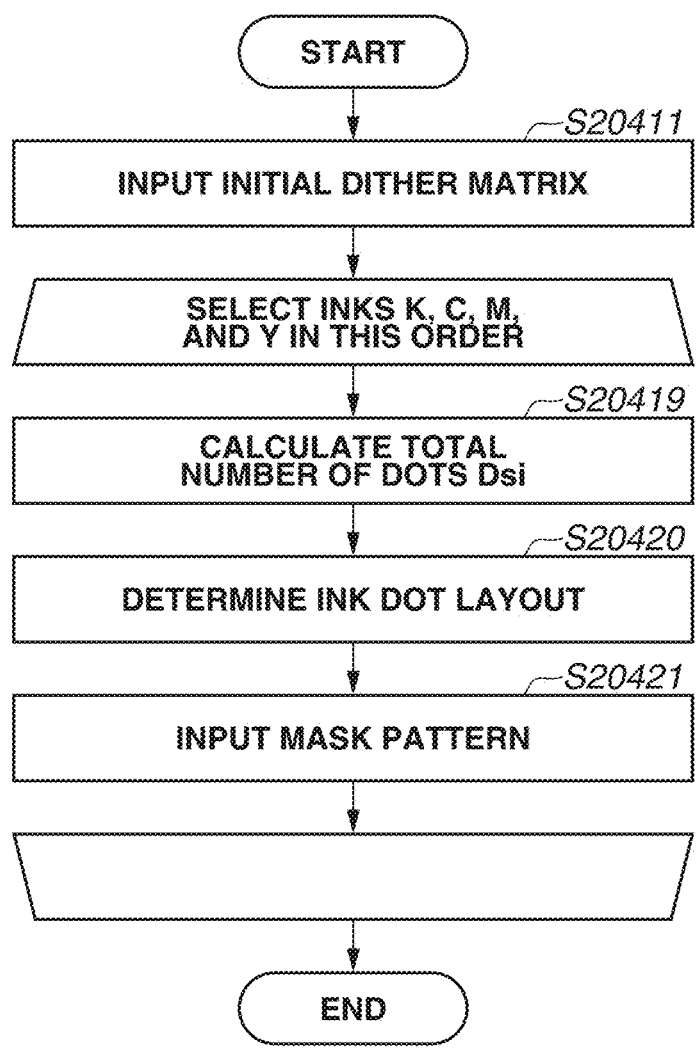
FIG. 19 is a flow chart illustrating scatter halftone processing in recording position determination processing according to a seventh exemplary embodiment of the present invention.

FIG. 19 is a flow chart illustrating the scatter halftone processing in the recording position determination processing according to the present exemplary embodiment.

The processing performed in step S20411 is similar to the processing in the first exemplary embodiment, so description thereof is omitted in steps S20419 to S20421 described below, the inks are sequentially selected as in the first exemplary embodiment, and an ink dot layout for each recording scan for the selected ink is determined.

In step S20419, processing similar to the processing performed in step S20413 is performed to calculate from the scatter recording amount data the total number of dots $Ds_i$ (i=C, M, Y, K) of the selected ink to be recorded in a 4×4 pixel region similar to the dither matrix 901.

Figure 21A:
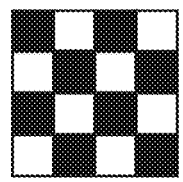
FIGS. 21A, 21B, 21C, and 21D schematically illustrate the relationship between an ink dot layout and ink dot layouts distributed to respective recording scans.

In step S20420, the threshold value in the dither matrix 901 is compared with M, and ink dot layout for the selected ink is determined. The ink dot layout is determined by setting each of the $Ds_i$ dots of pixels to the ON state starting from a pixel having the smallest threshold value Th(x, y) in the dither matrix 901. FIG. 21A illustrates an example of an ink dot layout in a case where Ds=8. Dots set to the ON state are specified in black, and dots not set to the ON state are specified in white.

In step S20421, a mask pattern 2001 is input. The mask pattern 2001 is data which indicates how the ink dot layout for the selected ink is distributed to the respective recording scans. The mask pattern 2001 is compared with the ink dot layout determined in step S20420 to distribute the ink dot layout to the respective recording scans. First, the mask pattern 2001 will be described below with reference to FIG. 20.

Figure 20:
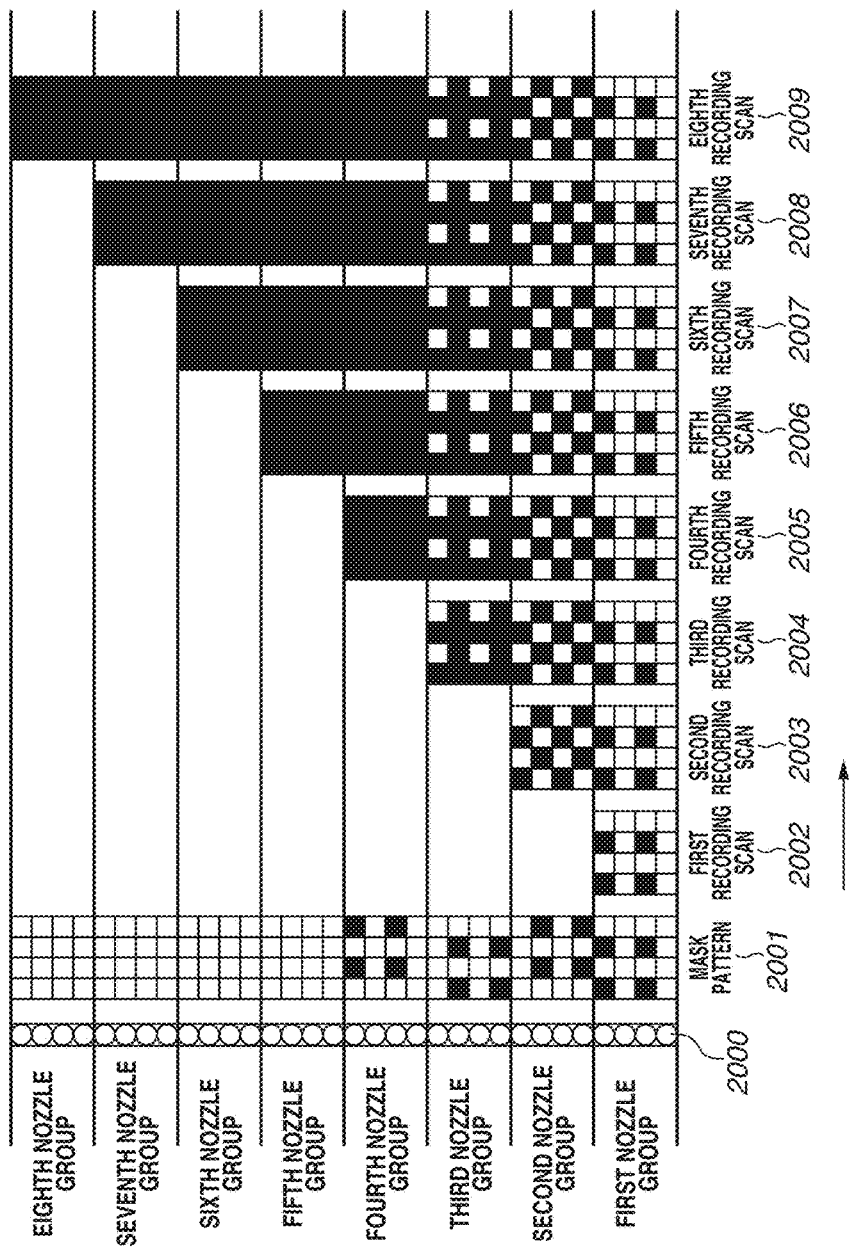
FIG. 20 schematically illustrates a recording head and a mask pattern.

FIG. 20 schematically illustrates the mask pattern 2001 and a recording head 2000. To simplify the description, the recording head 2000 includes 32 nozzles. The nozzles are divided according to the number of recording scans. For example, in the case where the number of recording scans is eight, the nozzles are divided into eight nozzle groups from first to eighths nozzle groups as illustrated in FIG. 20. In the mask pattern (recording pattern) 2001, unit regions on which each nozzle performs recording are specified in black. The patterns recorded by the respective nozzle groups are in a complementary relationship, and when the patterns are superimposed, the recording of a region corresponding to the 4×4 unit region is completed. Patterns 2002 to 2009 illustrate how an image is completed as the recording scans progress. Each time a recording scan is ended, the recording medium is conveyed by the width of each nozzle group in a direction specified by an arrow in FIG. 20. Accordingly, an image in one region (region corresponding to the width of each nozzle group) of the recording medium is completed when the eight recording scans are ended.

While the mask pattern in which the number of dots to be set to the ON state is evenly distributed to the respective recording scans, i.e., four dots in each recording scan, is used in the present exemplary embodiment, the mask pattern is not limited to the mask pattern described above as an example. The number of dots to be recorded can be determined with consideration for the dot placement accuracy for each nozzle. For example, the number of dots to be recorded can be unevenly distributed as follows: one dot for the first nozzle group, three dots for the second nozzle group, five dots for the third nozzle group, and seven dots for the four nozzle group.

Figure 21B:
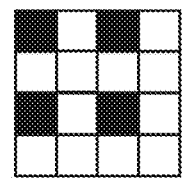
Figure 21C:
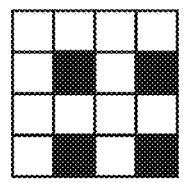
Figure 21D:
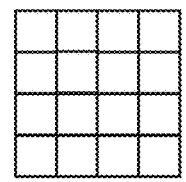

The mask pattern 2001 for each nozzle group is compared with the ink dot layout determined in step S20420, and the processing is performed to set the dots that have been set to the On state in both to the On state, and the ink dot layout obtained as a result of the processing is determined as an ink dot layout for each recording scan. Specifically, an ink dot layout acquired as a result of the processing performed using the mask pattern 2001 for the first nozzle group and the ink dot layout determined in step S20420 is set as an ink dot layout for the first recording scan. Further, an ink dot layout acquired as a result of the processing performed using the mask pattern 2001 for the second nozzle group and the ink dot layouts determined in step S20420 is set as an ink dot layout for the second recording scan. The processing for the third and subsequent recording scans is similar to the above-described processing, so description thereof is omitted. FIGS. 21B, 21C, and 21D illustrate ink dot layouts each acquired as a result of applying the mask pattern 2001 to the ink dot layout illustrated in FIG. 21A and distributing the ink dot layout to the ink dot layouts for the respective recording scans. FIG. 21B illustrates an example of the ink dot layout for the first recording scan. FIG. 21C illustrates an example of the ink dot layout for the second recording scan. FIG. 21D illustrates an example of the ink dot layout for the third to eighth recording scans. The above-described processing realizes the determination of an ink dot layout based on the total number of dots $Ds_t$ and the distribution of the determined ink dot layout to the ink dot layouts for the respective recording scans.

The present exemplary embodiment realizes a high ink covering ratio in regions where ink dots are formed on a recording medium, and also realizes an ink dot layout with large unevenness, as in the above-described first to sixth exemplary embodiments. Further, the present exemplary embodiment not only realizes a representation of a low gloss as in the first to sixth exemplary embodiments but also facilitates the control of the nozzles, e.g., the use of a nozzle with poor impact position accuracy or a nozzle that cannot discharge an ink can be stopped by changing the mask pattern.

While the example is described in the present exemplary embodiment in which the number of dots in a vertical direction of the dither matrix is the same as the number of dots of the nozzle group, the above-described example is not a limiting example. Even if the numbers of dots are not the same, a correspondence relationship, in a case of data having a smaller number of dots, can be determined by repeatedly referring to the lowermost to uppermost lines, and then the processing can be performed.

Exemplary embodiment(s) of the present invention can also be realized by one or more processors of a computer of a system or apparatus that read out and execute programs, supplied to the system or apparatus via a network or storage medium, for realizing the functions of one or more of the above-described exemplary embodiments. Further, exemplary embodiment(s) of the present invention can also be realized by one or more circuits (e.g., application-specific integrated circuit (ASIC)) for realizing the functions of one or more of the above-described exemplary embodiments.

The image processing is provided which realizes a representation of a low gloss while preventing a decrease in density range of a formed image that can be represented on a recording medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese No. 2016-072601, filed Mar. 31, 2016, and No. 2016-241709, filed Dec. 13, 2016, which are hereby incorporated by reference herein in their entirety.

What is claimed is:

1. An image processing apparatus configured to generate data for forming an image by recording at least a colored ink on a recording medium by using a printer, the image processing apparatus comprising:
    an input unit configured to input image data representing an image;
    a first determination unit configured to determine, based on the image data, a first recording amount for use in recording by arranging the colored ink side by side on the recording medium and a second recording amount for use in recording by stacking the colored ink at discrete positions on the recording medium; and
    an output unit configured to output layout data indicating a layout of the colored ink on the recording medium, the layout data being based on the first recording amount and the second recording amount,
    wherein a layer to be formed by arranging the colored ink side by side on the recording medium and a layer to be formed by stacking the colored ink at discrete positions on the recording medium are in a same region of a high-density portion of the image.

2. The image processing apparatus according to claim 1, wherein the first determination unit determines the first recording amount which is a recording amount of the colored ink and the second recording amount which is a recording amount of the colored ink and a colorless ink, and
wherein the output unit outputs layout data indicating a layout of the colored ink and the colorless ink on the recording medium, based on the first recording amount and the second recording amount.

3. The image processing apparatus according to claim 2, wherein the second recording amount is a constant recording amount for each region of the image.

4. The image processing apparatus according to claim 2, further comprising a forming unit configured to form a coating layer and an uneven layer, the coating layer being formed by performing recording based on first layout data for arranging the colored ink side by side on the recording medium using the first recording amount, and the uneven layer being formed by performing recording based on second layout data for stacking the colored ink and the colorless ink on the recording medium using the second recording amount.

5. The image processing apparatus according to claim 4, wherein the forming unit forms the uneven layer after forming the coating layer.

6. The image processing apparatus according to claim 1, wherein the first determination unit holds in advance a table indicating a relationship between the first recording amount and the second recording amount, and determines the ratio between the first recording amount and the second recording amount by referring to the table.

7. The image processing apparatus according to claim 1, wherein the first recording amount is a recording amount of an ink for coating the recording medium, and the second recording amount is a recording amount of an ink for adding unevenness to a surface of the image.

8. The image processing apparatus according to claim 1, further comprising a forming unit configured to form a coating layer and an uneven layer, the coating layer being formed by performing recording based on first layout data for arranging the colored ink side by side on the recording medium using the first recording amount, and the uneven layer being formed by performing recording based on second layout data for stacking the colored ink on the recording medium using the second recording amount.

9. The image processing apparatus according to claim 8, wherein the forming unit forms the uneven layer after forming the coating layer.

10. The image processing apparatus according to claim 1, wherein, in a case where a first ink and a second ink having a lower transmittance than the first ink are stacked on the recording medium, the second ink is recorded at a position lower than the first ink.

11. An image processing method for generating data for forming an image by recording at least a colored ink on a recording medium by using a printer, the image processing method comprising:

inputting image data representing an image;
determining, based on the image data, a first recording amount for use in recording by arranging the colored ink side by side on the recording medium and a second recording amount for use in recording by stacking the colored ink at discrete positions on the recording medium; and
outputting layout data indicating a layout of the colored ink on the recording medium, the layout data being based on the first recording amount and the second recording amount,
wherein a layer to be formed by arranging the colored ink side by side on the recording medium and a layer to be formed by stacking the colored ink at discrete positions on the recording medium are in a same region of a high-density portion of the image.

12. A non-transitory computer-readable storage medium storing instructions that, when executed by a computer, cause the computer to perform an image processing method for generating data for forming an image by recording at least a colored ink on a recording medium by using a printer, the method comprising:

inputting image data representing an image;
determining, based on the image data, a first recording amount for use in recording by arranging the colored ink side by side on the recording medium and a second recording amount for use in recording by stacking the colored ink in discrete positions on the recording medium; and
outputting layout data indicating a layout of the colored ink on the recording medium, the layout data being based on the first recording amount and the second recording amount,
wherein a layer to be formed by arranging the colored ink side by side on the recording medium and a layer to be formed by stacking the colored ink at discrete positions on the recording medium are in a same region of a high-density portion of the image.

13. A printer configured to form an image by recording at least a colored ink on a recording medium, the printer comprising:

an input unit configured to input image data representing density of an image; and
a formation unit configured to form, based on the image data, a first layer by arranging the colored ink side by side on the recording medium and a second layer by stacking the colored ink at discrete positions on the recording medium, wherein the first layer and the second layer are in a same region of a high-density portion of the image.

* * * * *